Figure 1:
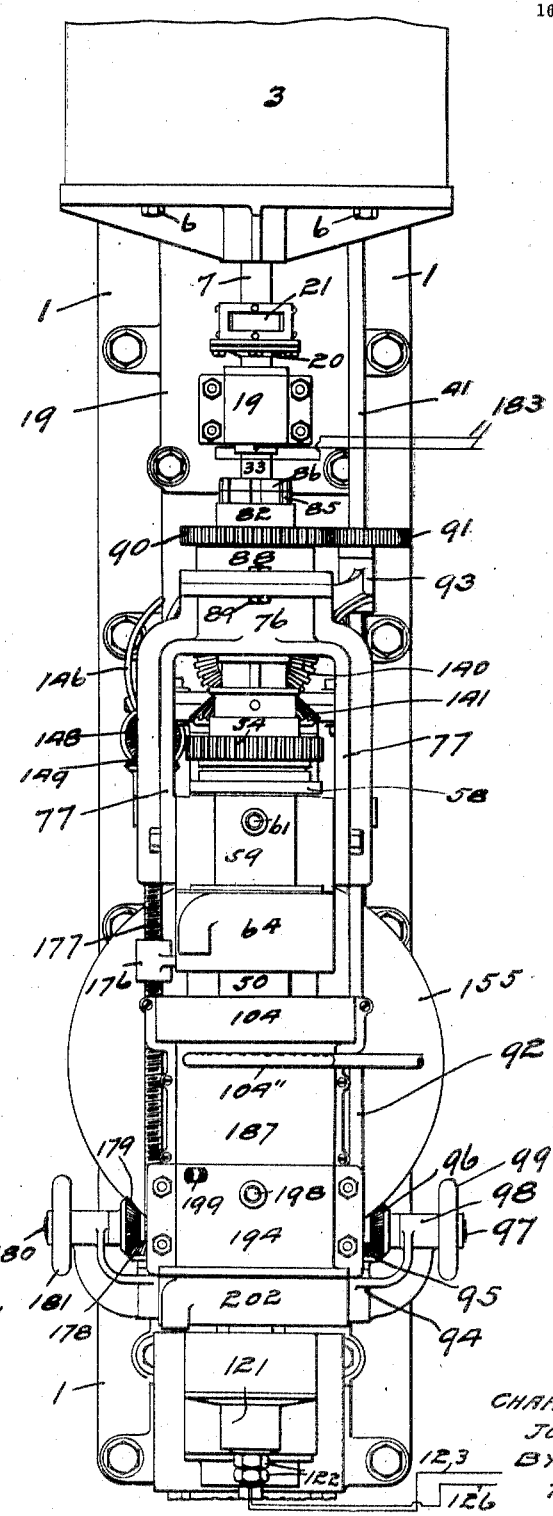

No. 777,560.  
PATENTED DEC. 13, 1904.  
C. B. STRAVS & J. N. JAGER.  
APPARATUS FOR FORMING PIPE.  
APPLICATION FILED JAN. 19, 1904.  
NO MODEL.  
16 SHEETS—SHEET 2.

WITNESSES  
O. G. Hanson  
M. Hagerty

INVENTORS  
CHARLES B. STRAVS  
JOHN N. JAGER  
BY Paul & Paul  
THEIR ATTORNEYS No. 777,560. PATENTED DEC. 13, 1904.
C. B. STRAVS & J. N. JAGER.
APPARATUS FOR FORMING PIPE.
APPLICATION FILED JAN. 19, 1904.
NO MODEL. 16 SHEETS—SHEET 3.

INVENTORS
CHARLES B. STRAVS
JOHN N. JAGER

No. 777,560.  
PATENTED DEC. 13, 1904.

C. B. STRAVS & J. N. JAGER.  
APPARATUS FOR FORMING PIPE.  
APPLICATION FILED JAN. 19, 1904.

NO MODEL.  
16 SHEETS—SHEET 9.

WITNESSES  
O. S. Hanson.  
M. Hagerty

INVENTORS  
CHARLES B. STRAVS  
JOHN N. JAGER  
BY Paul & Paul  
THEIR ATTORNEY

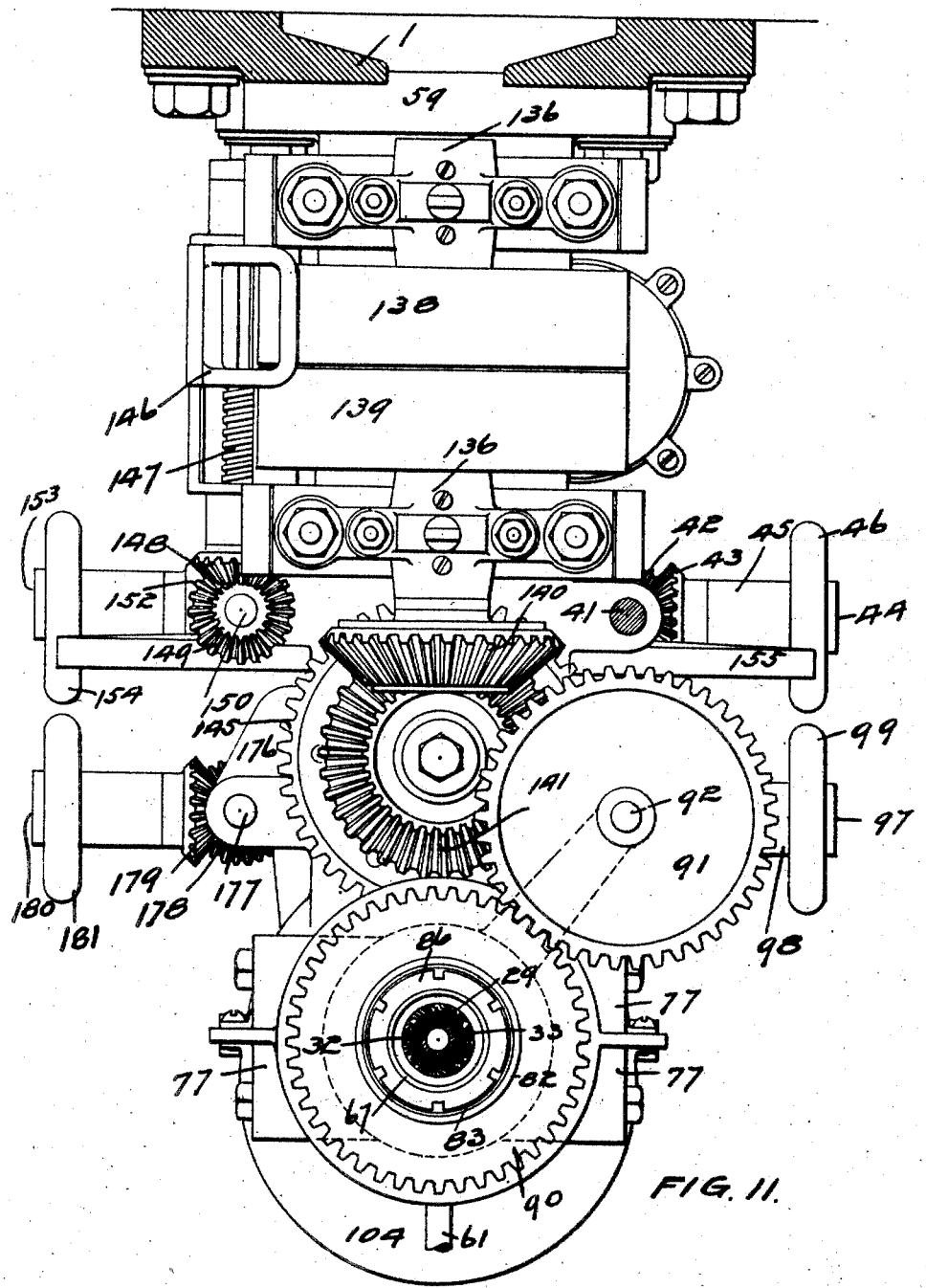

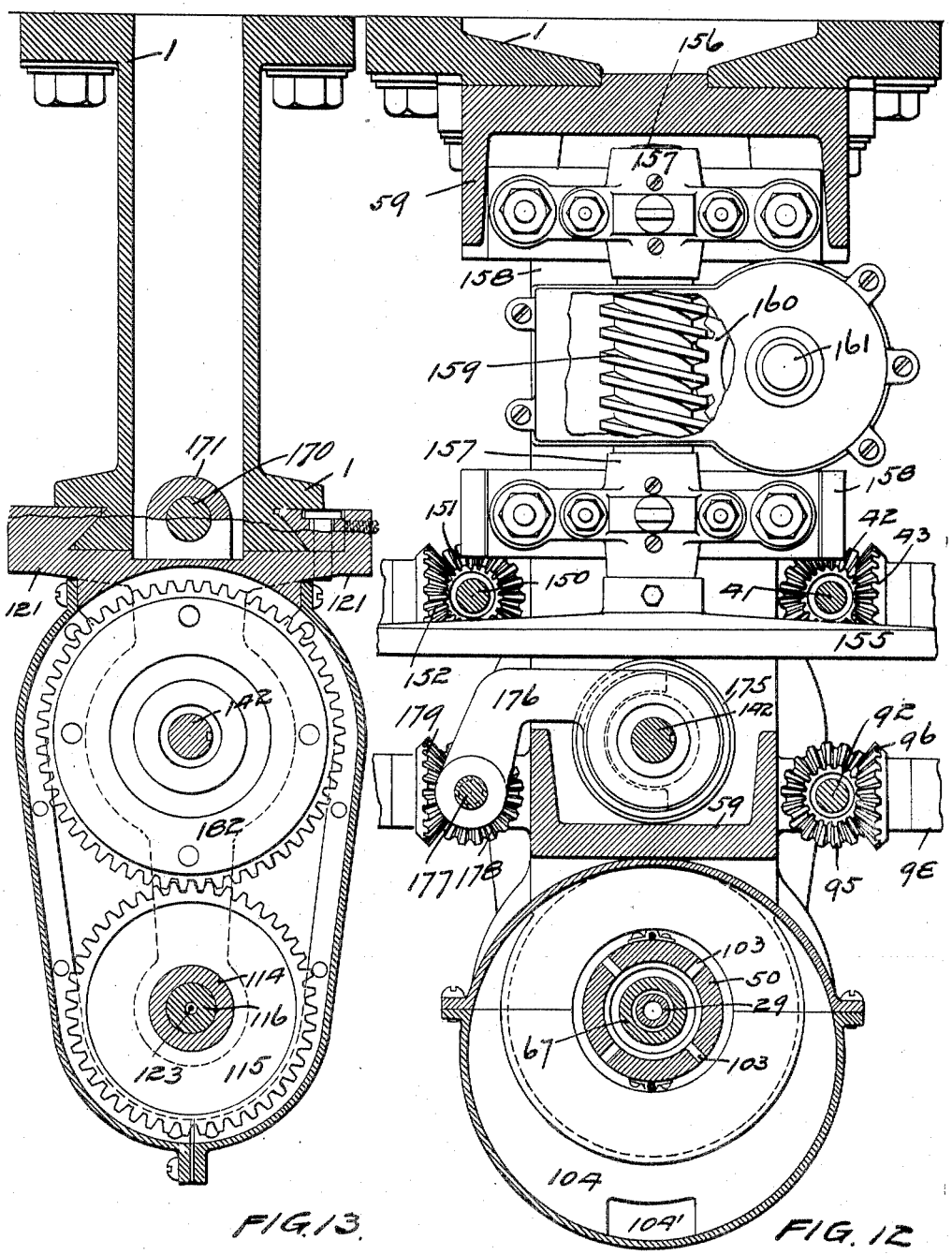

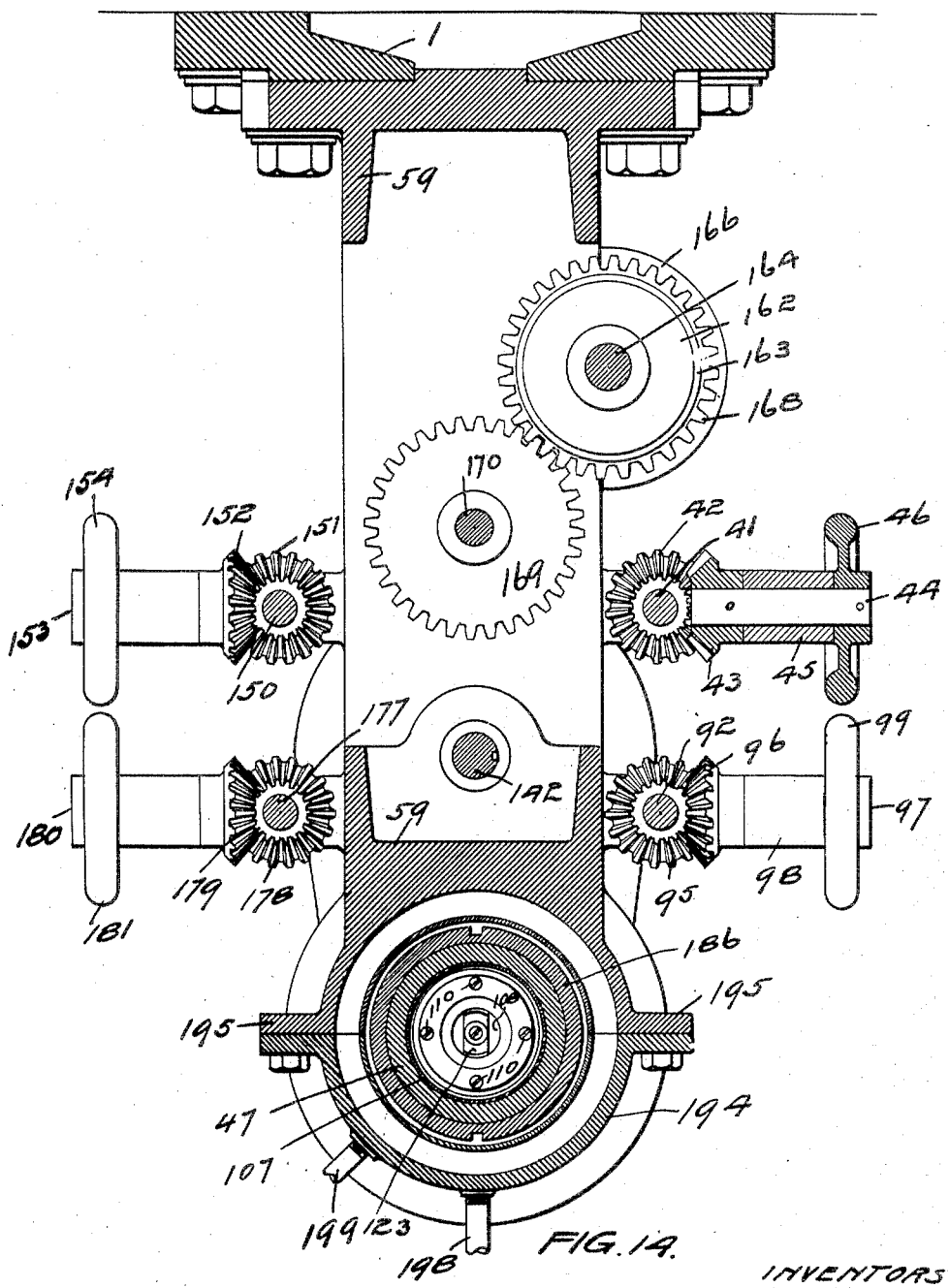

No. 777,560. PATENTED DEC. 13, 1904.
C. B. STRAVS & J. N. JAGER.
APPARATUS FORMING PIPE.
APPLICATION FILED JAN. 19, 1904.

NO MODEL. 16 SHEETS—SHEET 14.

WITNESSES
O. G. Hanson
M. Hagerly

INVENTORS
CHARLES B. STRAVS
JOHN N. JAGER
BY Paul & Paul
THEIR ATTORNEYS

No. 777,560. PATENTED DEC. 13, 1904.
C. B. STRAVS & J. N. JAGER.
APPARATUS FOR FORMING PIPE.
APPLICATION FILED JAN. 19, 1904.
NO MODEL. 16 SHEETS—SHEET 15.

WITNESSES
C. G. Hanson
M. Hagerty

INVENTORS
CHARLES B. STRAVS
JOHN N. JAGER
By Paul & Paul
THEIR ATTORNEYS

No. 777,560. PATENTED DEC. 13, 1904.
C. B. STRAVS & J. N. JAGER.
APPARATUS FOR FORMING PIPE.
APPLICATION FILED JAN. 19, 1904.
NO MODEL. 16 SHEETS—SHEET 16.
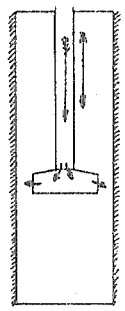
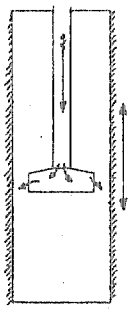
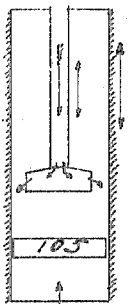
FIG. 20.    FIG. 21.    FIG. 22.
FIG. 27.    FIG. 28.    FIG. 29.
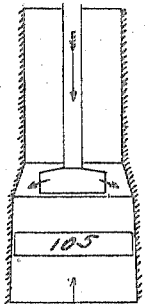
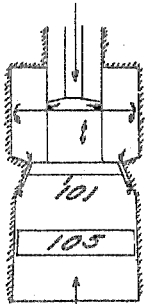
FIG. 23.    FIG. 24.    FIG. 25.
FIG. 30.    FIG. 31.    FIG. 32.
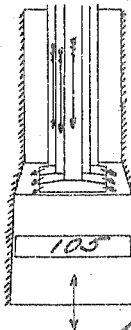
FIG. 26.
FIG. 33.
WITNESSES
O. G. Harron.
M. Hagerty.
INVENTORS
CHARLES B. STRAVS
JOHN N. JAGER
BY Paul & Paul
THEIR ATTORNEYS No. 777,560.

Patented December 13, 1904.

UNITED STATES PATENT OFFICE.

CHARLES B. STRAVS AND JOHN N. JAGER, OF MINNEAPOLIS, MINNESOTA, ASSIGNORS OF ONE-THIRD TO ANTHONY HUHN, OF MINNEAPOLIS, MINNESOTA.

APPARATUS FOR FORMING PIPE.

SPECIFICATION forming part of Letters Patent No. 777,560, dated December 13, 1904.

Application filed January 19, 1904. Serial No. 189,767. (No model.)

*To all whom it may concern:*

Be it known that we, CHARLES B. STRAVS and JOHN N. JAGER, of Minneapolis, in the county of Hennepin and State of Minnesota, have invented certain new and useful Improvements in Apparatus for Forming Pipe, of which the following is a specification.

This invention relates to a new and useful apparatus for forming pipe; and the objects we have in view are to provide means by which pipe in continuous lengths and of any material, but preferably of metal, may be inexpensively, rapidly, and perfectly formed.

The invention consists generally in an apparatus for forming pipe in which the pipe material in a molten or liquid condition is distributed by centrifugal force upon the inner surface of a rotating mold and fed along the inner surface of said mold in a direction parallel to its axis, whereby the pipe material becomes gradually solidified while it is held against the surface of the mold by such centrifugal force, the solidified pipe being fed out of the mold and received upon a suitable support, which may be rotated either at the same rate of speed as the mold and the liquid or molten pipe material upon its inner surface or may be rotated at a greater or less speed than the mold or may be stationary, whereby the pipe may be twisted before it becomes completely solidified.

The invention consists, further, in the constructions and combinations hereinafter described, and particularly pointed out in the claims.

Figure 2:
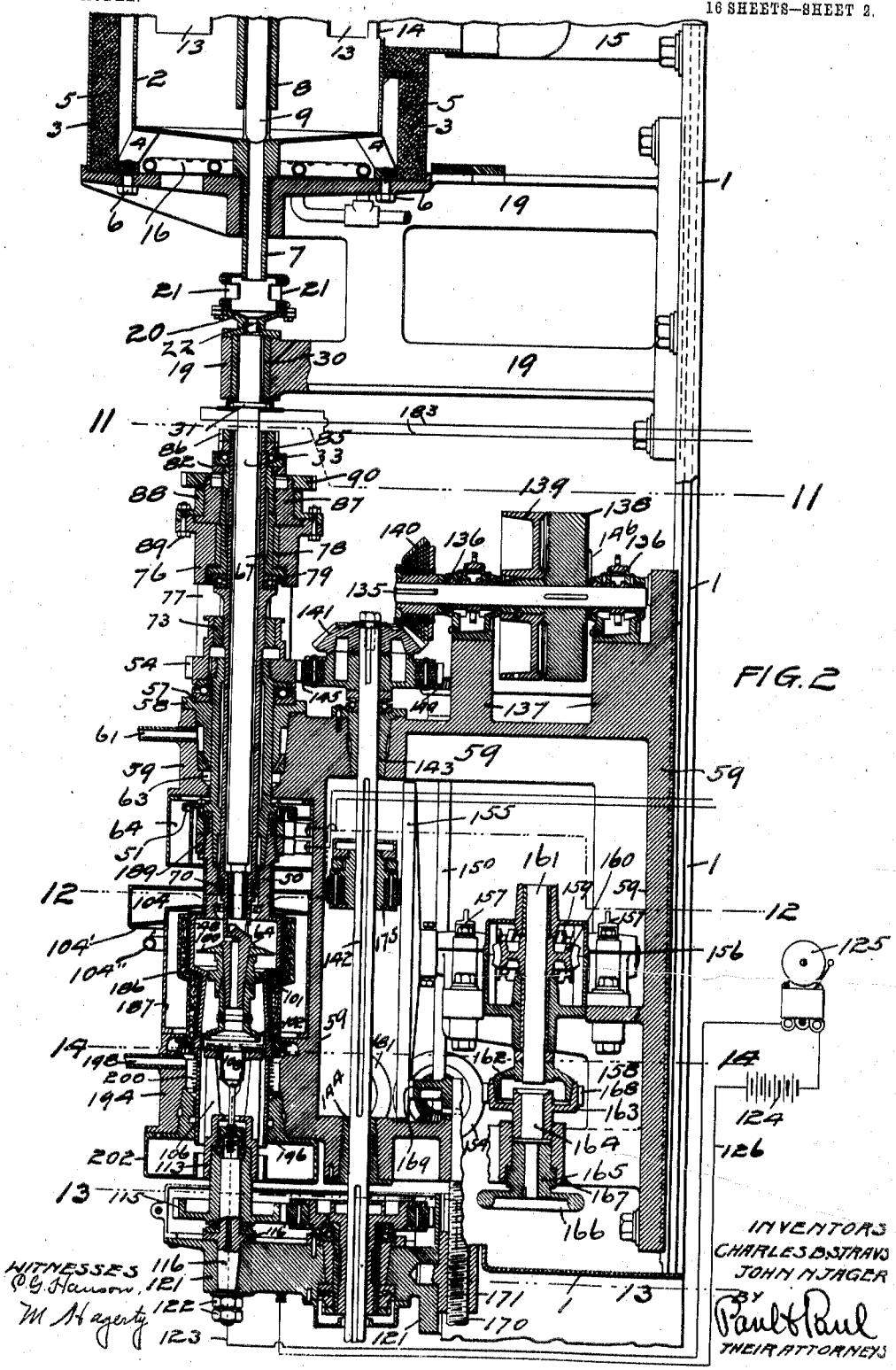
Figure 3:
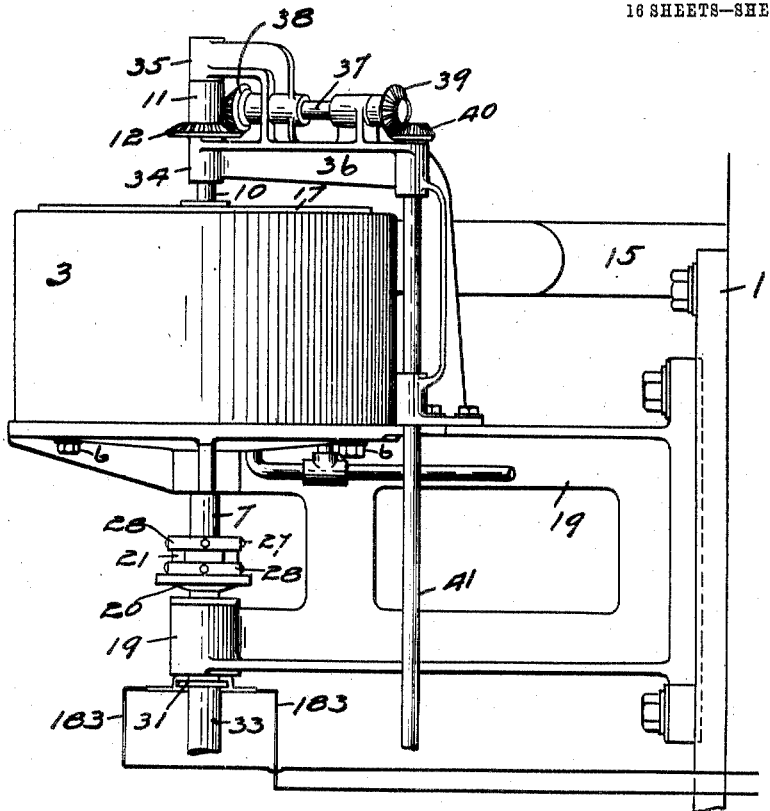
Figure 4:
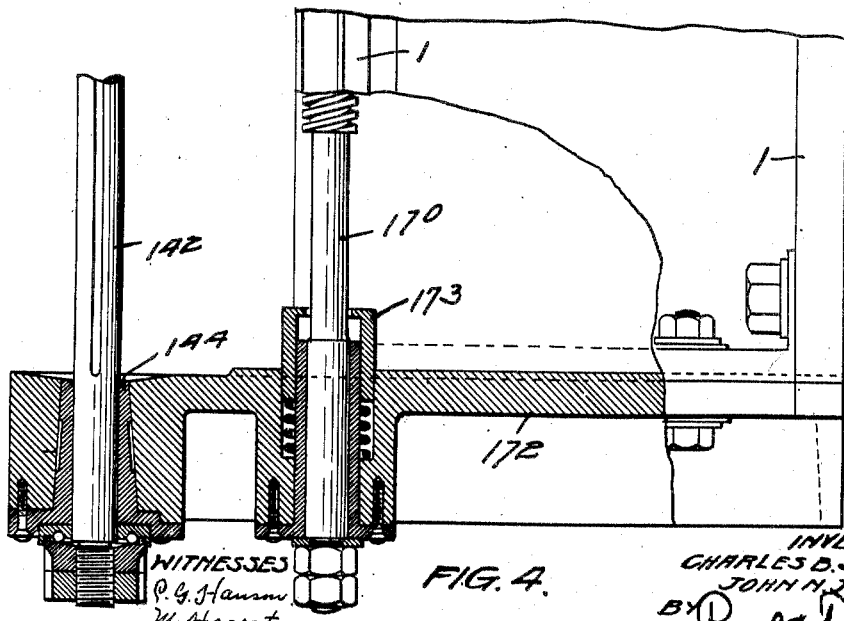
Figure 5:
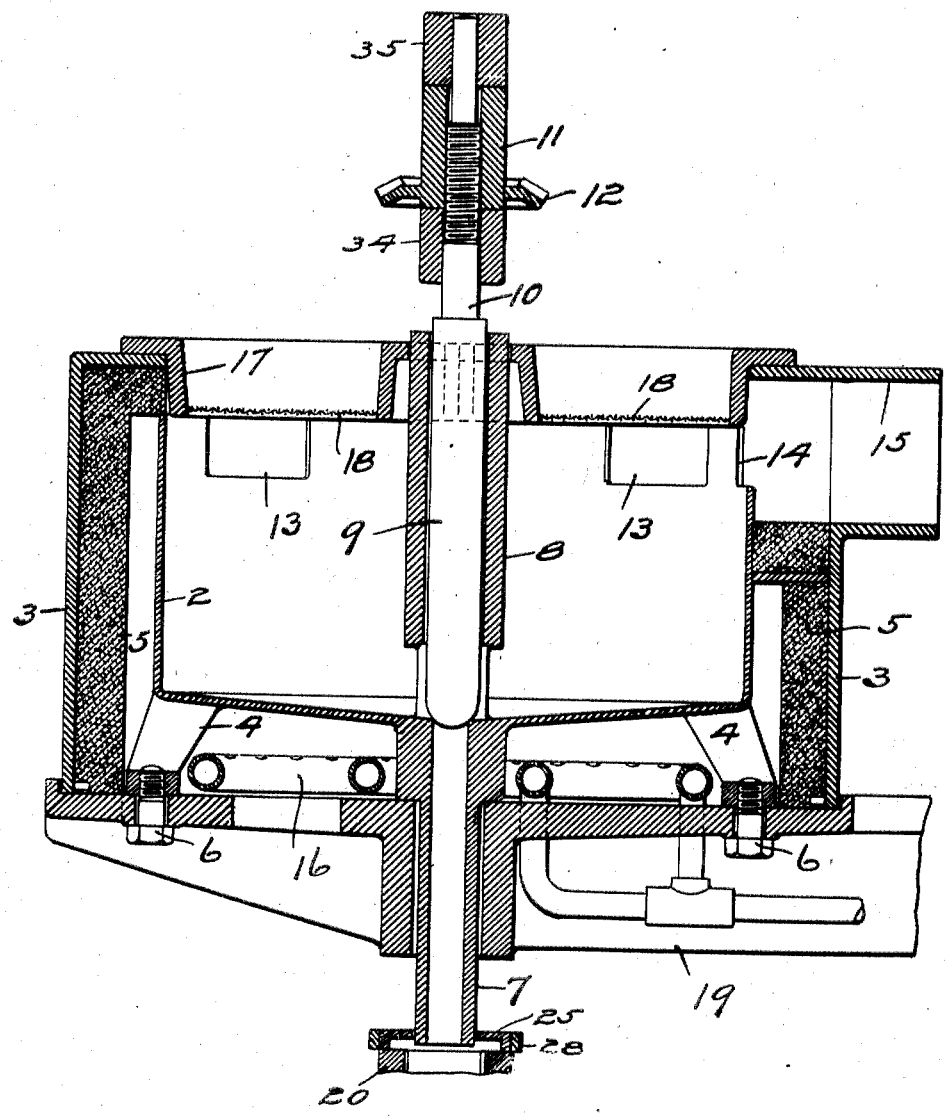
Figure 6:
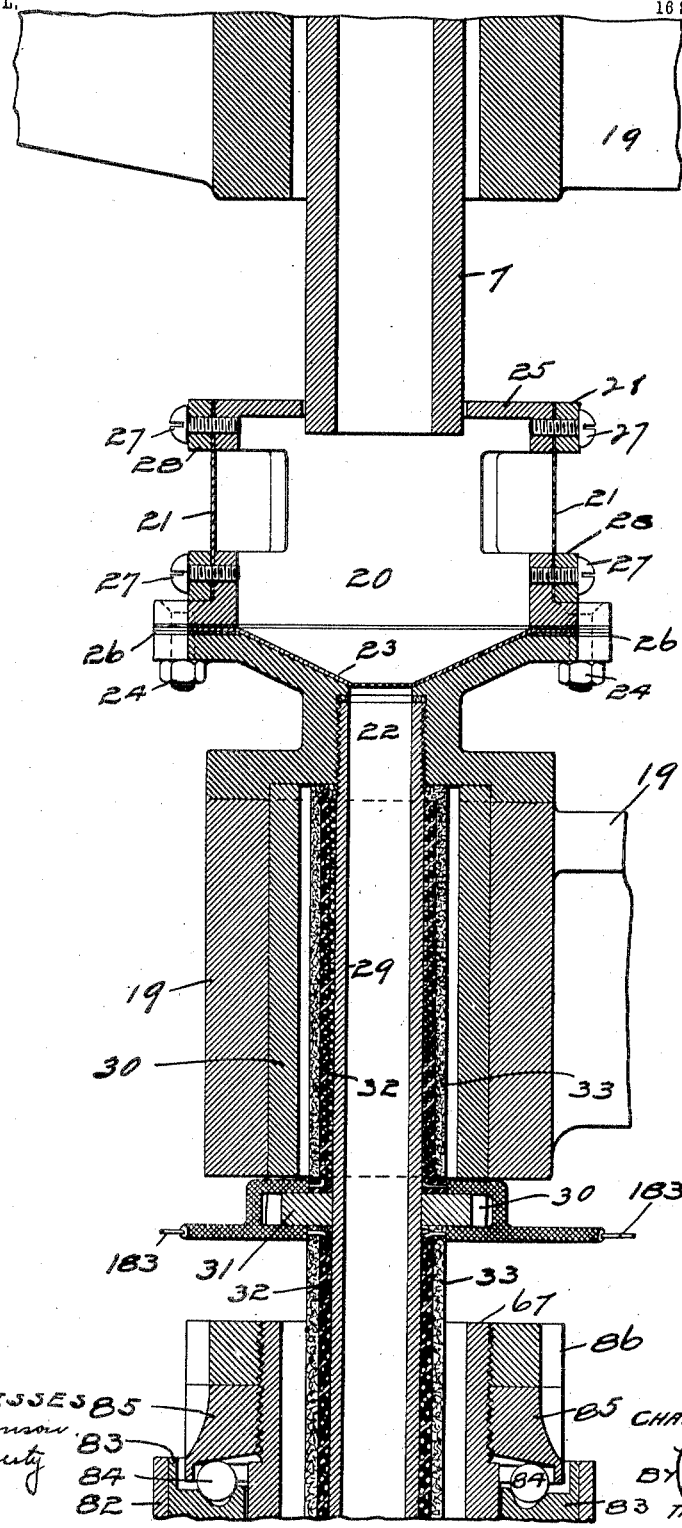
Figure 7:
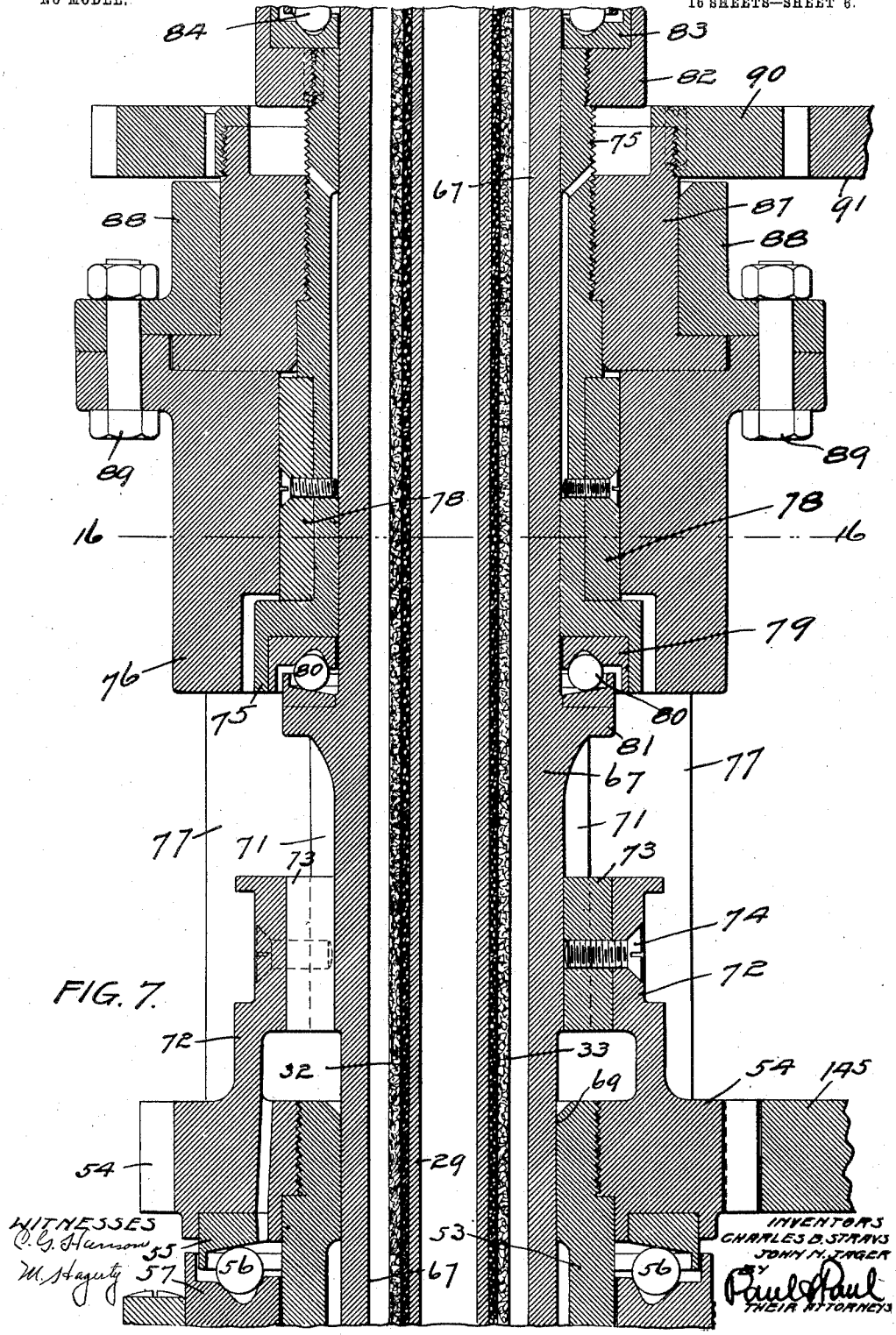
Figure 8:
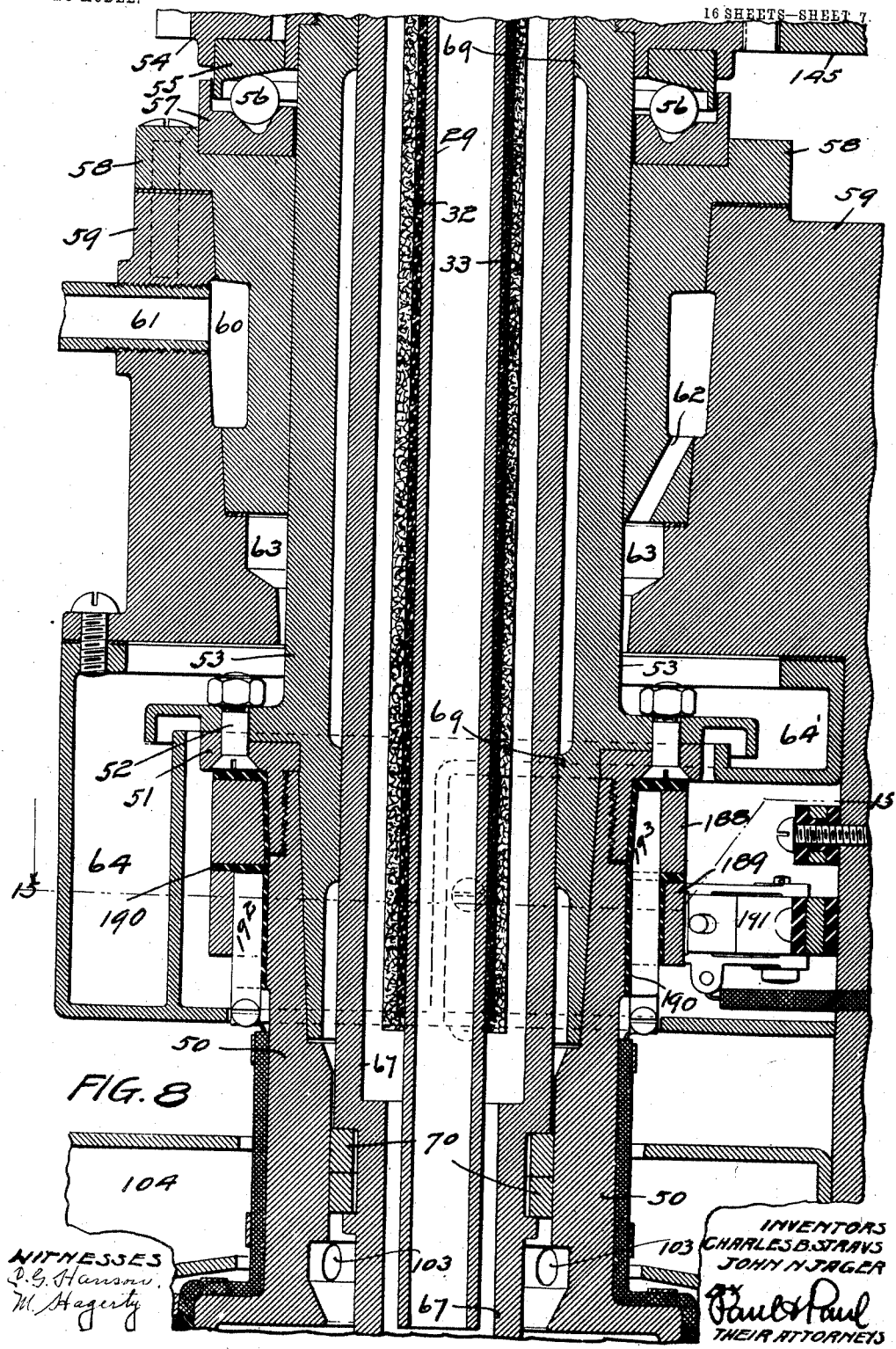
Figure 9:
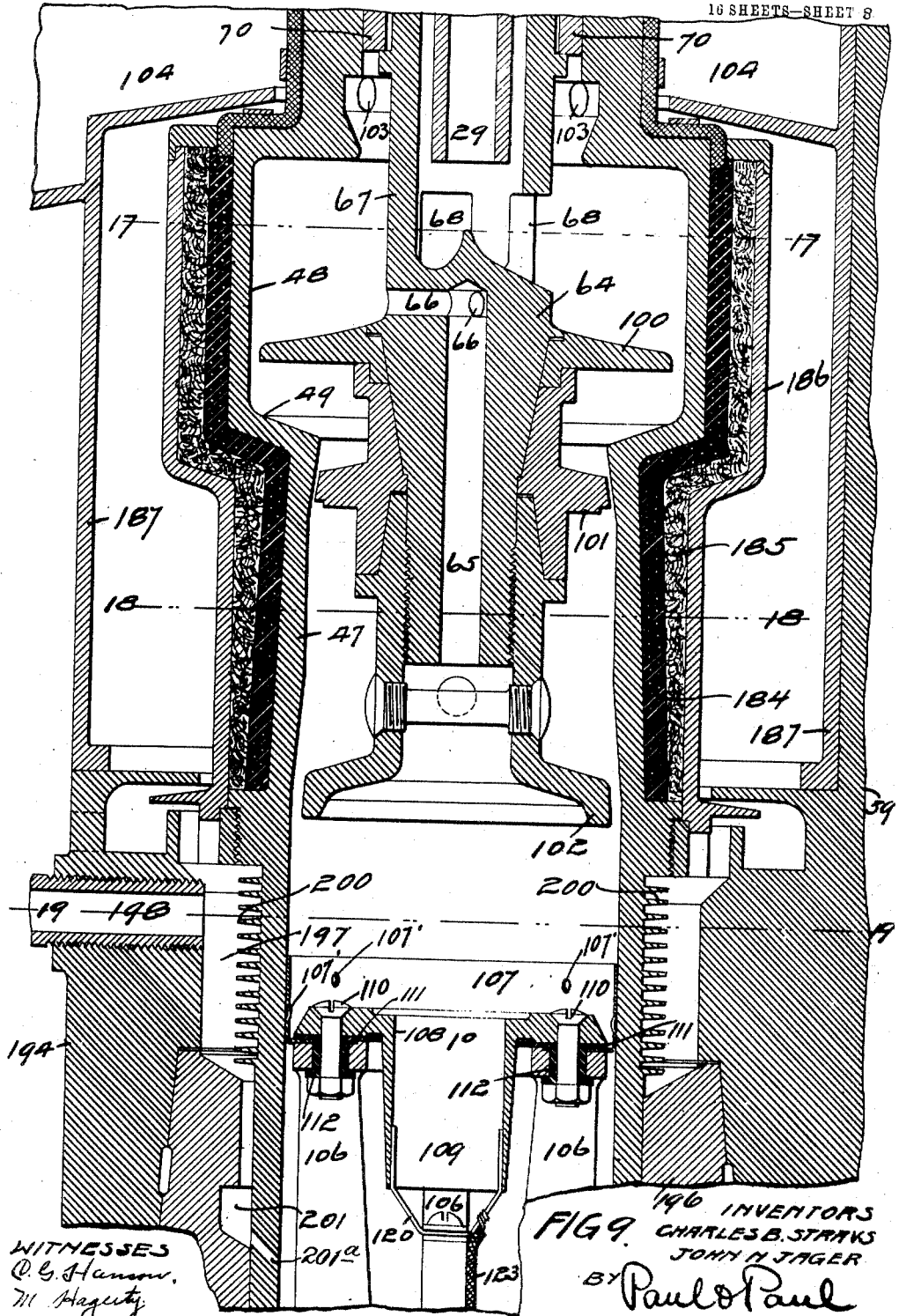
Figure 10:
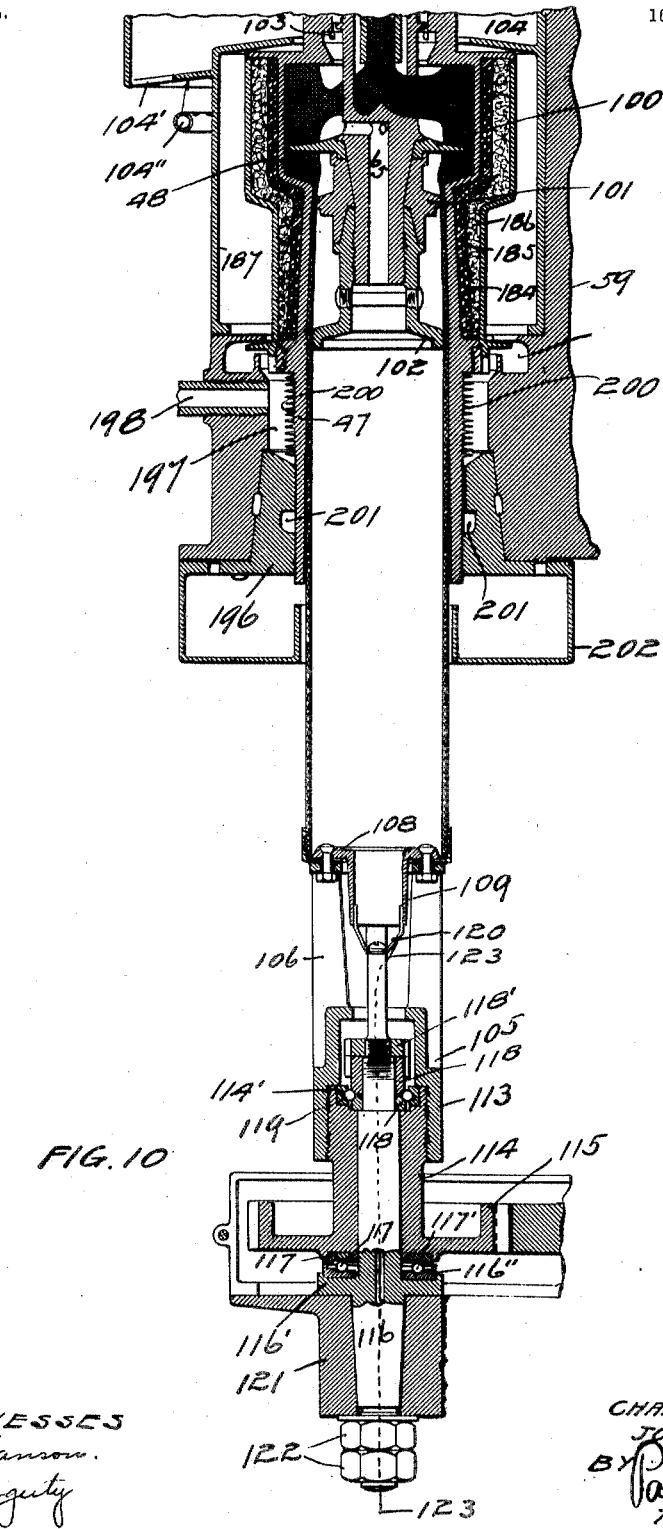
Figure 15:
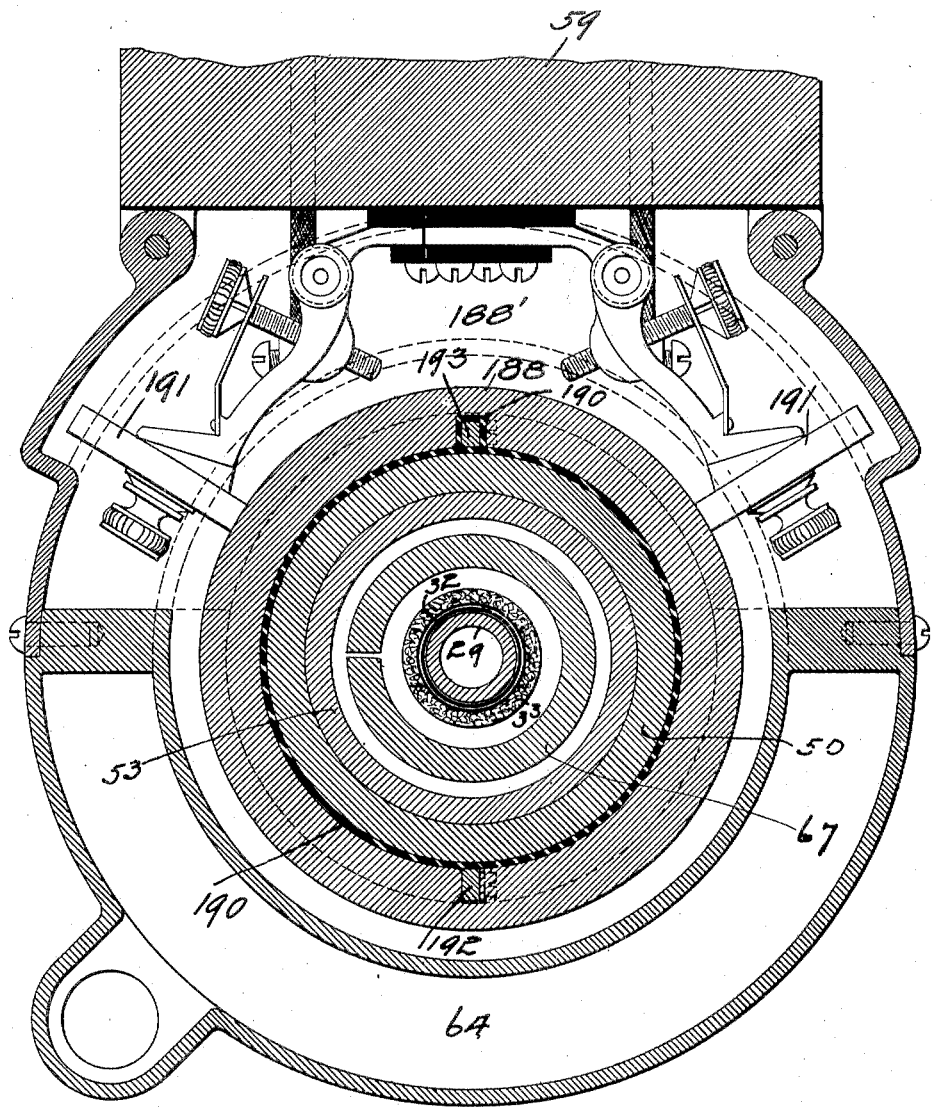
Figure 16:
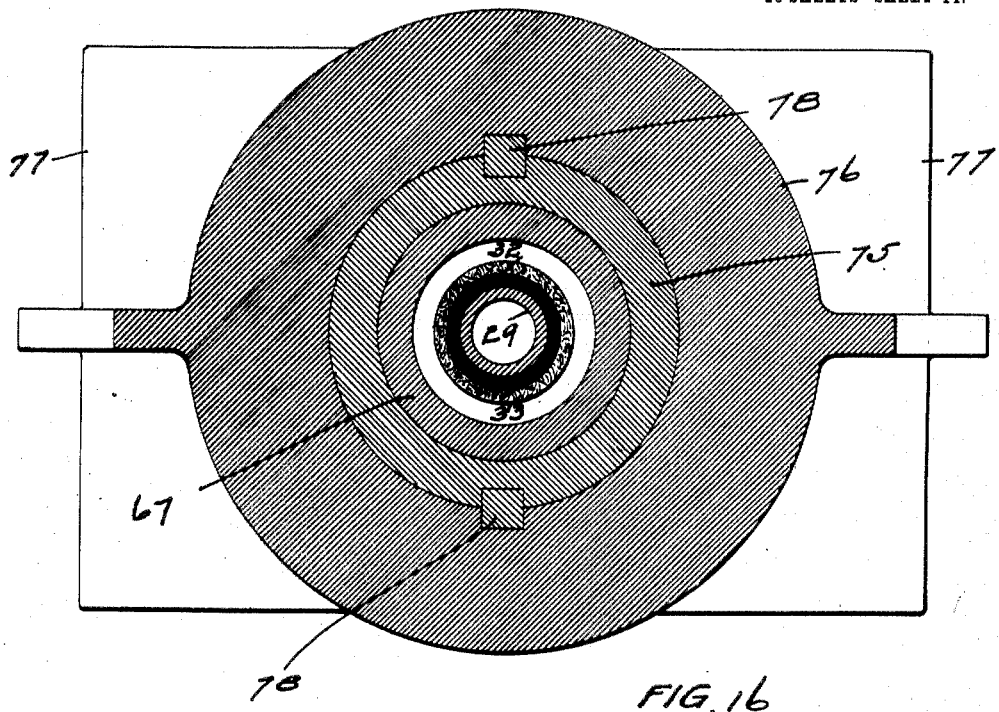
Figure 17:
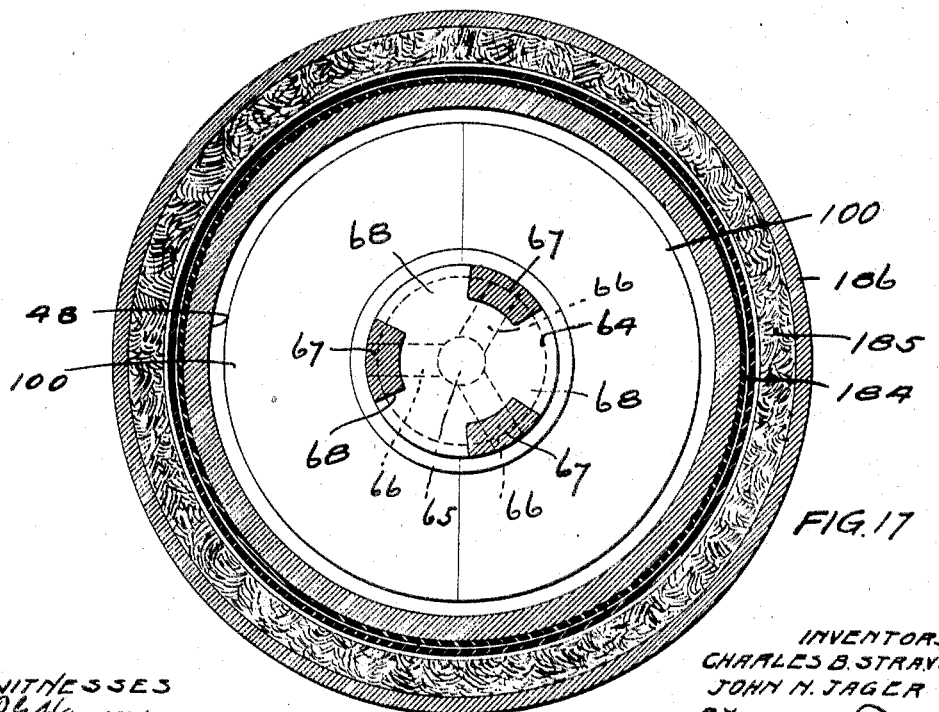
Figure 18:
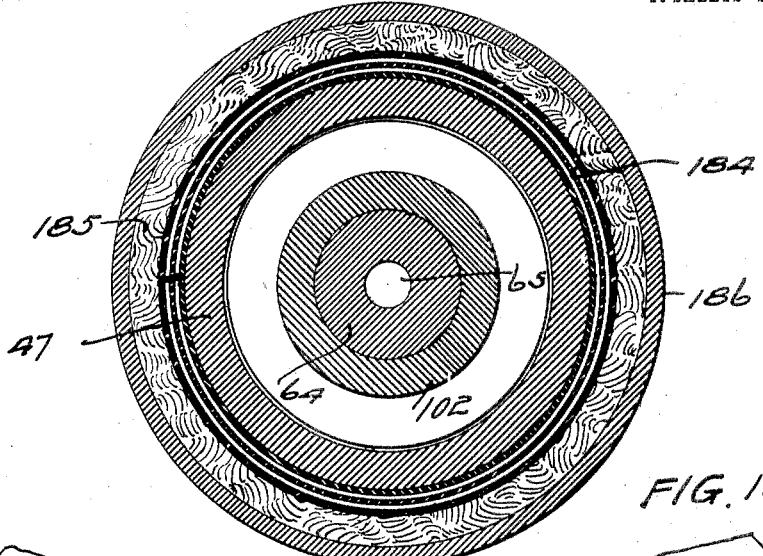
Figure 19:
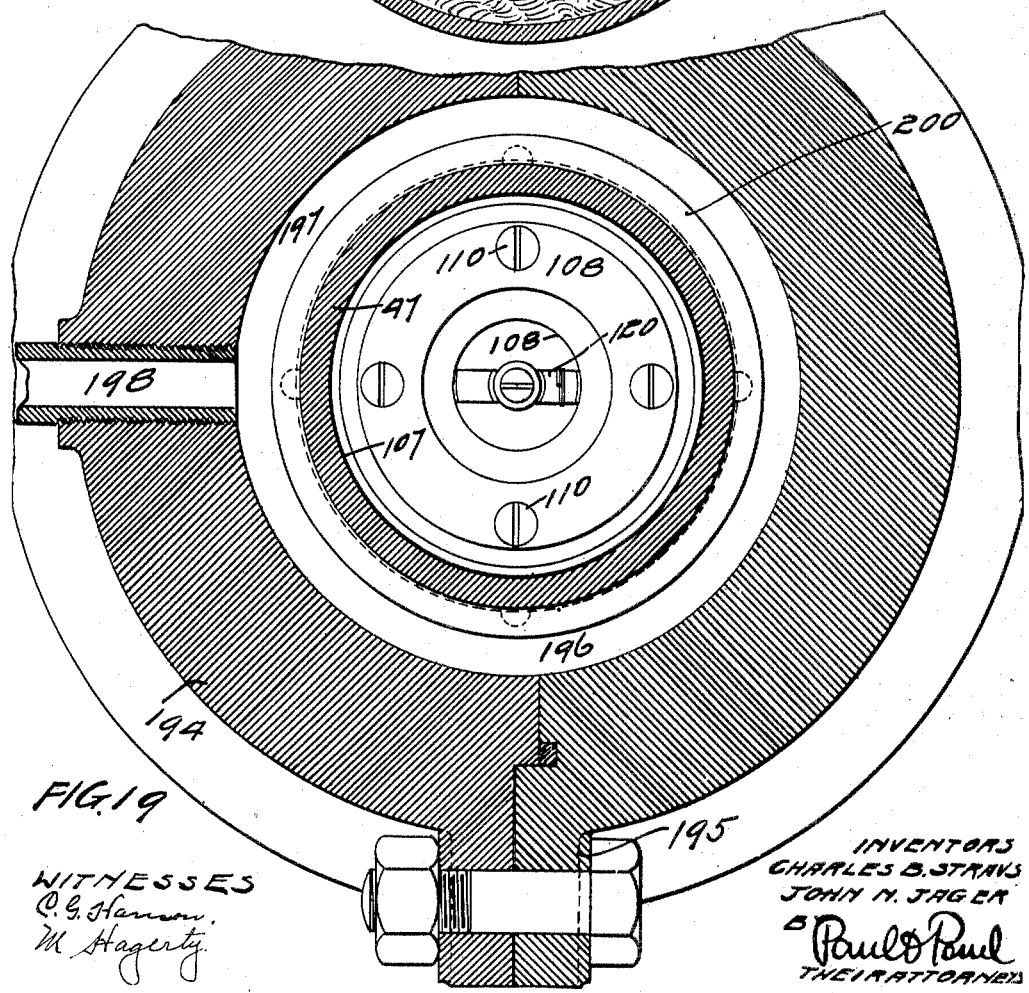

In the accompanying drawings, forming part of this specification, Figure 1 is a front elevation of pipe-forming apparatus embodying our invention. Fig. 2 is a central vertical section of the same. Fig. 3 is a side elevation of a portion of the apparatus, showing the means for melting the pipe material and delivering it to the forming mechanism. Fig. 4 is a detail showing a portion of the mechanism for controlling the movements of the pipe-support. Fig. 5 is a detail section of the mechanism for melting the pipe material and feeding it to the pipe-forming mechanism. Fig. 6 is a vertical section of the upper part of the apparatus below the means for melting the pipe material. Fig. 7 is a vertical section of the portion of the apparatus immediately below that shown in Fig. 6. Fig. 8 is a vertical section of the portion of the apparatus immediately below that shown in Fig. 7. Fig. 9 is a vertical section of the portion of the apparatus immediately below that shown in Fig. 8, showing in section the mold, the plunger, and valve arranged therein, and the pipe-support. Fig. 10 is a vertical section on a smaller scale of the mold and support, showing a section of pipe being formed therein. Fig. 11 is a horizontal section on line 11 11 of Fig. 2. Fig. 12 is a horizontal section on line 12 12 of Fig. 2. Fig. 13 is a horizontal section on line 13 13 of Fig. 2. Fig. 14 is a horizontal section on line 14 14 of Fig. 2. Fig. 15 is a horizontal section on line 15 15 of Fig. 8. Fig. 16 is a horizontal section on line 16 16 of Fig. 7. Fig. 17 is a horizontal section on line 17 17 of Fig. 9. Fig. 18 is a horizontal section on line 18 18 of Fig. 9. Fig. 19 is a horizontal section on line 19 19 of Fig. 9. Figs. 20, 21, 22, 23, 24, 25, and 26 are outline vertical sections of a mold and plunger, illustrating different movements that may be given to the parts. Figs. 27, 28, 29, 30, 31, 32, and 33 are respectively outline plan views of the mold and plunger shown in Figs. 20 to 26 and illustrating the different movements that may be given to said parts.

The apparatus shown and described in this application is designed particularly for forming pipe in continuous lengths of any suitable material, but preferably of lead, copper, iron, or of other suitable metal or of a mixture or composition of two or more metals.

In an application for Letters Patent filed by us January 2, 1904, Serial No. 187,475, we have described and claimed a process of forming pipe. In the present application we have shown, described, and claimed an apparatus which may be used for carrying out our process described and claimed in the application above referred to.

In the present application we have shown and described an apparatus comprising generally, first, means for reducing the pipe material to molten condition; second, means for conducting the pipe material to the material-distributing means; third, the mold upon the inner surface of which the pipe material is distributed and from the pipe is formed and from which mold the pipe is fed as it is formed; fourth, means for distributing the pipe material upon the inner surface of the mold, regulating the supply thereto, and polishing the interior surface of the formed pipe; fifth, a support on which the end of the formed pipe is received and by which it is held as the pipe is fed out of the mold; sixth, means for rotating at a high speed the mold and the pipe-material distributer, whereby the pipe material is distributed and held by centrifugal force upon the interior surface of the mold; seventh, means for operating the pipe-support; eighth, means for keeping the pipe material in a molten condition from the time it leaves the melting apparatus until it is distributed upon the inner surface of the mold, and, ninth, means for cooling the portion of the mold along which the pipe material passes after the pipe has been formed and while it is becoming solidified.

We will describe the different portions of the apparatus in detail, referring incidentally to other details.

*Means for reducing the pipe material to molten condition.*—The means for reducing the pipe material to molten condition is shown in Figs. 1, 2, 3, and 5. This means consists of a suitable melting-pot 2, arranged within a casing 3 and supported by suitable legs 4. The casing is preferably provided with a fire-clay lining 5, and the legs 4 of the pot are preferably secured to the bottom of the casing by suitable screws 6. The pot is preferably provided with a central discharge-pipe 7, extending through the bottom of the casing. A tube 8 is preferably arranged above the discharge-opening of the pot, suitable openings being provided in this tube, at the lower end thereof, through which the material may pass into the discharge-pipe 7. A valve 9 is arranged in the tube 8, and this valve has a stem 10, provided with a screw-thread and engaged by a nut 11, which is formed integrally with a suitable beveled gear 12. The wall of the melting-pot is provided with a series of openings 13 and also with a discharge-opening 14, communicating with a flue or pipe 15. The flue 15 extends to a suitable chimney or smoke flue. A suitable burner 16 is arranged within the casing 3 below the melting-pot 2, and the flames and gases from this burner pass around the melting-pot 2, between it and the lining 5 of the casing, and through the openings 13 to the interior of the pot and thence to the opening 14. Arranged upon the top of the melting-pot is an open trough 17, having a wire-screen bottom 18. The lower end of the valve 9 is preferably rounded off, and a sharp edge is left at the upper end of the discharge-opening, so that when the valve is closed this edge cuts through the material and prevents an accumulation thereof under the valve. The bottom of the casing is formed integrally with a suitable bracket 19, which is bolted or otherwise suitably secured to a vertical frame 1, which forms the main frame of the machine. When the pipe is to be formed of metal, the pieces of pipe material are placed in the trough 17, resting upon the screen 18. This material is melted by the heat from the burner 16 and flows through the screen 18 into the pot 2, where it is kept in a molten condition by the flame from the burner passing under, around, and through the pot. We do not, however, confine ourselves to the use of this specific device for bringing the pipe material into molten condition, as any other suitable apparatus may be used for this purpose. We may, if preferred, use a suitable blast-furnace for reducing the material to molten condition, providing means for conducting the molten material from such furnace to the means for distributing the material upon the inner surface of the mold.

*Means for conducting the pipe material to the material-distributing means.*—The bracket 19 also forms a support for a hopper 20, arranged below and adapted to receive the molten material from the discharge-pipe 7. The side walls of this hopper are preferably provided with openings that are covered by the mica sheets 21, through which the material in the hopper may be inspected. The base of the hopper is preferably provided with a conical bottom, having a discharge-opening 22, and said bottom is preferably covered by a perforated metal sheet 23, having its edges arranged between packing-rings 26 and secured between the side walls and the bottom of the hopper. (See Fig. 6.) The side walls of the hopper are preferably made of a suitable casting secured upon the bottom by suitable bolts 24, and a cover 25 is formed integrally with said side walls. The mica sheets 21 are secured in position by rings 28 and screws 27. The discharge-pipe 7 extends through the top of the hopper 25, and the material from the melting-pot is discharged through the pipe 7 into the hopper. The bottom of the hopper rests upon the bracket 19, and a tubular conductor 29 is screwed into the bottom of the hopper and extends downward nearly to the mold hereinafter described. We prefer to arrange the end of the bracket 19 with a tubular opening, through which the conductor 29 extends and within which is a sleeve 30, extending upward and having its upper end projecting into a recess in the bottom of the hopper. (See Fig. 6.) This sleeve is larger than the conductor 29, so that an annular space is provided between the inner surface of said sleeve and the outer surface of the annular conductor 29. A disk 31 is preferably arranged upon the outer surface of the conductor 29 below the bracket 19, and the sleeve 30 preferably projects below said bracket, and said disk 31 fits into the lower end of said sleeve. Suitable heating-coils 32, hereinafter more particularly described, surround the conductor 29, extending nearly its entire length, and outside of said heating-coils is an asbestos or other suitable non-conducting covering 33. As above stated, the stem 10 of the valve 9, which controls the discharge of material from the melting-pot to the conductor 29, is screw-threaded and may be raised and lowered by turning the threaded nut 11 and gear 12. The nut 11 is made in the form of a sleeve, and it is arranged between two bearings 34 and 35 upon a bracket 36, which extends upward past the casing 3 and then horizontally over the top of said casing, being secured by suitable means upon the bracket 19. The stem 10 of the valve 9 is held by the bearings 34 and 35, and the nut or sleeve 11 is arranged between said bearings, so that by turning said sleeve the valve 9 is raised or lowered. For the purpose of rotating said sleeve we provide a horizontal shaft 37, having at one end a beveled pinion 38, engaging the pinion 12, and at its other end a pinion 39, engaging a pinion 40 upon a vertical shaft 41. The shafts 37 and 41 are supported in bearings upon the bracket 36, and the shaft 41 at its lower end is provided with a pinion 42, that meshes with a similar pinion 43 upon a short shaft 44, mounted in a bearing 45 and provided with a hand-wheel 46. (See Figs. 11, 12, and 14.) By turning the hand-wheel 46 the valve 9 may be opened or closed, and thereby the discharge of material from the melting-pot to the conductor 29 may be controlled.

*The mold.*—The mold which we prefer to employ for the formation of the pipe is shown in vertical section in Figs. 2, 9, and 10 and in horizontal section in Figs. 14, 17, 18, and 19. It is preferably circular in cross-section, though not necessarily so. The mold proper is designated in the drawings by the reference-figure 47, and above it, and preferably formed integrally therewith, is a distributing-chamber 48. The distributing-chamber 48 is of larger diameter than the mold, and an inclined wall 49 at the bottom of the distributing-chamber serves to unite the upper end of the mold and the cylindrical wall of the distributing-chamber. The upper portion of the mold is preferably of frusto-conical form, the smaller diameter being at the upper end, and below this portion of the mold is another similar section, the inclination of the walls, however, being somewhat less, and below this second section is a third section of similar form, with the walls of substantially the same inclination as the first section. The lower portion of the mold may be of uniform diameter or slightly conical, as shown in Fig. 10. The upper end of the mold and distributing-chamber has a sleeve 50 formed integrally therewith. This sleeve is threaded at its upper end and is connected to a flanged ring 51, which is secured by bolts 52 to a flange upon the lower end of a sleeve 53. The upper part of the sleeve 50 fits onto the conical lower end of the sleeve 53. (See Fig. 8.) The upper end of the sleeve 53 has screwed on to it a spur-gear 54, upon the under side of which is a bearing-ring 55, resting upon the antifriction-balls 56, that are supported upon a ring 57. The ring 57 is stationary and rests upon the upper end of a ring-bearing 58, that is supported upon a bracket 59, that is bolted or otherwise suitably secured to the main frame 1 of the machine. For the purpose of keeping the bearing-ring 58 and the sleeve 53 from becoming heated we provide a water-chamber 60, partly in the ring-bearing 58 and partly in the wall of the bracket 59. (See Fig. 8.) A supply-pipe 61 connects with this chamber. Openings 62 and 63 permit the escape of the water into the chamber 64, arranged below the bracket 59, after it has passed around the sleeve 53. Through the gear 54, by means hereinafter described, the mold is rotated at a high speed. Means are provided, as hereinafter described, for heating the walls of the distributing-chamber and the upper part of the mold and also for cooling the walls of the lower part of the mold. The mold may be of hexagonal or other desired form in cross-section, in which case the pipe that is formed will have a cylindrical opening through it and its outer form will correspond to the cross-section of the mold.

*Means for distributing the pipe material.*—We provide means by which the pipe material in molten condition is distributed upon the inner surface of the mold, where it is held by centrifugal force. This means consists of a plunger 64, arranged within the distributing-chamber 48 and the upper part of the mold 47. The plunger 64 has a central opening 65 and the cross-openings 66, through which gases from the lower part of the mold may pass into the chamber 48. The plunger 64 is connected to a tubular stem 67, that extends upward within the sleeves 50 and 53 and surrounding the tubular conductor 29. This stem is provided within the chamber 48, and just above the plunger 64, with a series of openings 68. The stem 67 is held in a central position in the mold by the annular projections 69 on the inner surface of the sleeve 53, and the split rings 70, arranged in an annular groove in the stem and between said stem and the inner surface of the sleeve 50. (See Fig. 8.) The stem 67 and the plunger 64 are caused to rotate with the mold 47 and the chamber 48, and said stem and plunger are adapted to be raised and lowered in said mold and chamber. For the purpose of causing the stem and plunger to rotate with the mold we provide vertical grooves 71 in the outer surface of the stem at a point above the spur-gear 54. A ring 72 is formed upon or secured to the gear 54, and blocks 73, secured in this ring by screws 74, engage the grooves 71 and cause the stem 67 to rotate with the mold, while leaving it free to be vertically adjusted.

The upper part of the stem 67 passes through a sleeve 75, that is arranged in a bearing 76, that is supported on the bracket 59 by the standards 77. The sleeve 75 is provided with blocks or keys 78, that extend into grooves in the bearing 76 and keep said sleeve from turning. The lower end of the sleeve is provided with a bearing-ring 79, and a series of antifriction-balls 80 are arranged between said ring and a flange 81 on the stem 67. The upper end of the sleeve 75 has secured to it a flanged ring 82, and a bearing-ring 83 rests upon this ring and the end of the sleeve 75. A series of antifriction-balls 84 rest on the ring 83. A ring 85 is secured upon the upper end of the stem 67, being held in place by the lock-ring 86. The bottom of the ring 85 bears upon balls 84. (See Fig. 6.) The upper portion of the sleeve 75 is screw-threaded and passes through a flanged threaded ring 87, that rests upon the bearing 76, and is held in position by the flanged ring 88, that is secured to the bearing 76 by suitable bolts 89. A spur-gear 90 is screwed onto the upper end of the ring 87, and this gear is engaged and adapted to be rotated by a pinion 91, that is mounted on a vertical shaft 92, held in bearings 93 and 94, and provided with a bevel-pinion 95, that engages a similar pinion 96 on a short shaft 97, that is mounted in a bearing 98 and provided with a hand-wheel 99. (See Figs. 1, 11, 12, and 14.) By turning the hand-wheel 99 the pinion 91 is rotated and turns the gear 90 in either direction desired. This turns the ring 87, and thereby raises or lowers the sleeve 75, and with it the stem 67 and the plunger 64.

The plunger 64 carries the disk 100, arranged within the chamber 48, and the valve 101, arranged within and near the top of the mold 47. (See Fig. 9.) The principal purpose in raising and lowering the plunger is to adjust the valve 101 in relation to the mouth of the mold. By raising the plunger the valve is brought nearer to the wall of the mold, and by lowering the plunger the valve is moved farther away from the wall of the mold. In this manner the amount of material that is allowed to pass from the distributing-chamber to the mold can be accurately regulated.

To the lower end of the plunger we prefer to secure a disk 102, whose edge comes quite close to the wall of the mold at the lower end of the conical portion. The edge of this disk serves to smooth and polish the inner surface of the pipe that is being formed. (See Fig. 10.) Different sizes of polishing-disks may be used for different thicknesses of pipe.

The movement of the molten material in the formation of the pipe is illustrated in Fig. 10 of the drawings. It passes from the conductor 29 into the stem 67 of the plunger 64 and is distributed by centrifugal force through the openings 68 upon the wall of the distributing-chamber 48. As the plunger, the chamber, and the mold all rotate rapidly the molten material is distributed and held by centrifugal force upon the walls of the chamber and mold. The heavier purer material will be brought nearest to the wall of the distributing-chamber, and as no material can reach the mold except that which passes between the edge of the disk 100 and the wall of the chamber it follows that the lighter material and dross or slag will be held back by the disk 100 and will rise in the chamber to the top of the material contained therein, and if sufficient material is in the chamber a portion of the lighter material will overflow through the openings 103 into the chamber 104. The chamber 104 projects forward beyond the mold-casing and is provided with an opening 104' in its under surface, through which the molten material may escape. A burner 104" is arranged under the chamber 104 to keep the material therein in a molten condition. (See Figs. 2 and 16.) The overflow-openings 103 and chamber 104 not only provide for the escape of the lighter material, slag, or dross, but prevent the material from rising in the space between the stem of the plunger and the conductor 29 and also between the outside of this stem and the inside of the sleeve that supports the mold and distributing-chamber. If, therefore, the material is fed into the distributing-chamber faster than it is fed therefrom to the mold, it will pass out through the openings 103 into the chamber 104 and escape from this chamber through the opening in the bottom wall thereof. The valve 101 regulates the distribution of the material upon the inner surface of the mold. We adjust this valve so as to admit sufficient material to form a pipe of the desired thickness. As the material enters the mold it moves downward, owing to its molten condition, under the influence of centrifugal force and the conical shape of the mold. The material is kept in a substantially molten condition until it reaches the cylindrical part of the mold or until it passes the lower end of the heating-coils. It then begins to solidify, and as it passes the edge of the disk 102 the inner surface of the pipe is smoothed and polished. As the material passes the disk 102 it reaches the cooled part of the mold. The end of the pipe reaches and rests upon the support 105, hereinafter described.

*The pipe-support.*—The pipe as it is fed out of the mold is received on a pipe-support, and this support is moved downward at proper speed to insure the proper feeding of the pipe. The pipe-support 105 consists of suitable standards 106, carrying at their upper ends the metal ring-plate 107, which fits closely within the wall of the mold. A flat ring 108, having a central depending flange 109, is also supported on the standards 106, is secured in position by bolts 110, and is insulated from the plate 107 by an insulating-ring 111 and blocks 112. The standards 106 are connected to a sleeve 113, that is secured upon the hub 114 of a gear 115. The gear 115 is mounted upon a stationary spindle 116. This spindle has a flange 116', upon which is placed a steel ring 116'', and the under surface of the gear 115 is provided with a steel ring 117. Antifriction-balls 117' are arranged between the bearing-rings 116'' and 117. At the upper end of the sleeve 114 is a steel bearing-ring 114', and the spindle is provided with bearing-rings 118, held in position by a locking-ring 118', and antifriction-balls 119 are arranged between the bearing-ring 114' and the rings 118. The upper end of the spindle carries a metal plate 120, secured thereto by an insulated connection and having its free ends connected to a flange 109 upon the ring 108. The spindle 116 is secured in a bracket 121, being held in position by suitable nuts 122. There is an opening longitudinally through the spindle 116, and an electric conductor 123, insulated from the spindle, passes through this opening and is connected to the metal plate 120. This conductor 123 extends to a suitable battery 124 and bell 125, and from the bell 125 another conductor, 126, extends to some portion of the frame of the machine. (See Fig. 2.) The ring 107 is provided with a series of holes 107'. When the pipe-forming operation is to be commenced, the support is moved upward, so that the rings 107 and 108 are close to the conical portion of the mold, as represented in Fig. 2 of the drawings. As the molten material passes downward along the wall of the mold it passes inside of the vertical flange of the ring 107, and a part of it enters the holes 107' in said ring. It will be seen that the metal plates 107 and 108 are insulated from each other and that the electric circuit is completed by the molten material which comes in contact with both of said plates. This will cause the bell 125 to ring and will show to the operator that the pipe material has reached the support and that said support should begin to move downward in order to feed the pipe downward along the cylindrical portion of the mold and out of its lower end.

*Means for rotating the mold and distributer.*—We have stated that power was applied to the spur-gear 54 for the purpose of rotating at a high speed the mold and the plunger through which the material is distributed upon the inner surface of the mold. A driving-shaft 135 is mounted in suitable bearings 136, preferably located in standards 137 upon the bracket 59. The shaft 135 is provided with the fast pulley 138, the loose pulley 139, and the bevel-gear 140. This gear meshes with another gear, 141, upon a vertical shaft 142, that is mounted in suitable bearings 143 and 144 upon the bracket 59. Upon the shaft 142 is a spur-gear 145, that engages with a gear 54. By this means the mold and plunger may be rotated at any desired speed. For shifting the belt from one pulley to the other we prefer to provide a belt-shifter consisting of a loop 146, that engages the belt and which may be moved from one pulley to the other by a threaded shaft 147, having a bevel-pinion 148, that engages a similar pulley 149 upon the vertical shaft 150. The shaft 150 has upon its lower end a pinion 151, that meshes with a pinion 152 upon a short shaft 153, provided with a hand-wheel 154. The driving-shaft as here shown is located at some distance above the floor of the room in which the apparatus is located. The means described permit a quick shift of the driving-belt from one pulley to the other.

*Means for operating the pipe-support.*—The pipe-support is arranged to be fed downward at any desired rate of speed. The thickness of the pipe will depend partially upon the speed at which the pipe-support is lowered. We therefore provide means by which this support may be lowered or raised at any desired speed. A friction-disk 155 is mounted upon a horizontal shaft 156. (See Fig. 12.) This shaft is supported in suitable bearings 157 upon a bracket 59, formed upon or secured to the main frame of the machine. The shaft 156 is provided with a worm 159, which engages a worm-wheel 160 upon a shaft 161. (See Figs. 2 and 12.) This shaft 161 is arranged in a vertical position and is mounted in suitable bearings secured upon the bracket 158, which forms a part of the bracket 59. Upon the lower end of the shaft 161 is one member, 162, of a friction-clutch. The other member, 163, is mounted upon a short vertical shaft 164, upon which it is free to rotate. The lower end of this shaft is carried by a threaded sleeve 165, having a hand-wheel 166 and engaging a threaded bearing 167 in the bracket 158. By turning the sleeve 165 in one direction the clutch member 163 is brought into engagement with the clutch member 162 and is caused to rotate therewith. By turning the sleeve in the opposite direction the clutch member 163 is disengaged from the clutch member 162. The clutch member 163 is provided upon its periphery with a series of gear-teeth 168, and these teeth engage a pinion 169 upon a vertical shaft 170. (See Fig. 14.) The bracket 121 is arranged to move vertically upon the vertical ways formed upon a forwardly-projecting portion of the main frame 1. (See Fig. 13.) A threaded lug 171

(see Figs. 2 and 13) is secured to the vertically-adjustable bracket 121, and this lug is engaged by the shaft 170, a portion of which is screw-threaded. The lower ends of the shafts 142 and 170 turn in bearings in a stationary bracket 172. (See Fig. 4.) The screw-thread on the shaft 170 terminates at a short distance above the lower end of the shaft, and a spring-supported sleeve 173 surrounds the shaft below said screw-threaded portion. A friction-pulley 175 is mounted upon the shaft 142 in position to be in engagement with the face of the friction-disk 155. (See Fig. 2.) This pulley rotates with the shaft 142, but is connected thereto by a groove and spline and is capable of being adjusted above or below the center of the disk 155. The disk 155 is driven from the shaft 142 through the friction-pulley 175, and the pulley 175 may be adjusted so as to drive the disk 155 in either direction and at any desired speed. When the disk 155 is driven in one direction and the two members of the clutch hereinbefore described are brought into connection with each other, the shaft 170 will be rotated, so as to feed the bracket 121 and the pipe-support carried thereby gradually and regularly downward, thereby feeding the pipe as it is formed downward through and out of the mold. The thickness of the pipe, as before stated, will be governed partially by the speed at which the support is lowered. The end of the pipe will be connected to the support by the material when in a molten condition entering the holes in the flange 107. As the pipe becomes solidified this flange will exert a downward pull thereon and will at the same time cause the pipe to rotate with the support. The length of the pipe will therefore depend solely upon the extent of movement of the support. When the bracket 121 has been moved downward to the limit of its movement, the lug 171 will have passed below the threaded portion of the shaft 170 and will rest upon the sleeve 173. The spring-supported sleeve will press the lug upward and hold it in contact with the end of the screw-thread. The lug will, however, remain stationary so long as the shaft continues to rotate in the same direction. When, however, the direction of rotation of the shaft is reversed, the lug will be engaged by the screw-thread on the shaft 170, and the bracket and support will then be raised.

We provide means for moving the friction-pulley 175 upon the shaft 142, so as to regulate the speed at which the pipe-support is lowered or raised and the direction of its movement. For this purpose an annular groove is formed in the hub of the pulley, and a fork 176 engages this groove. (See Fig. 12.) The shank of the fork is provided with a threaded opening, and a threaded shaft 177 engages said opening. This shaft is mounted in suitable bearings and is provided with a bevel-pinion 178, that engages a corresponding pinion 179 upon a short shaft 180, mounted in a suitable bearing and provided with a hand-wheel 181. By turning this hand-wheel the shaft 177 is operated and the fork 176 is raised or lowered, and thereby the pulley 175 is moved up or down over the face of the disk 155. For the purpose of rotating the support at the same speed as the mold we provide a gear 182, mounted in the bracket 121 by suitable anti-friction-bearings and having a spline connection with the shaft 142. This gear engages the gear 115, upon which the support is arranged, and by this means the support is rotated with the mold and at the same rate of speed. By suitable changes in the connecting-gearing the support could be rotated at a greater or less speed than the mold, or, if preferred, it could be arranged to remain stationary while the mold is rotated.

*Means for keeping the pipe material in molten condition.*—We provide means by which the pipe material will be kept in a molten condition while it is being conducted from the melting-pot to the distributing-chamber and mold and while it is being distributed and held by centrifugal force upon the inner surface of the distributing-chamber and the upper part of the mold. For the purpose of keeping the material in molten condition while being conducted to the distributing-chamber and mold we surround the conductor 29 with the series of heating-coils 32, and to these coils we connect the electrical conductors 183, which lead from any suitable source of electricity. As before explained, the conductor 29 is stationary, and the electric conductors 183 are connected to the heating-coils above the rotating stem of the plunger and distributer and below the supporting-bracket 19. (See Fig. 6.) The heating-coils 32 are preferably covered by a suitable asbestos or other covering 33. The heating-coils and the asbestos covering preferably extend nearly the full length of the conductor 29. (See Figs. 7 and 8.) The outer surface of the upper portion of the mold and the outer surface of the distributing-chamber are also covered by suitable heating-coils 184, surrounded by a suitable asbestos or other covering 185. (See Fig. 9.) Outside of the covering 185 we prefer to arrange a metallic covering 186, which is secured to and rotates with the mold and which holds the heating-coils and asbestos covering in place. An outer casing 187 is supported upon the supporting-bracket of the machine and surrounds the upper part of the mold and the distributing-chamber. (See Fig. 9.) Upon the upper part of the sleeve 50 are the metallic rings 188 and 189. (See Fig. 8.) These rings are insulated from each other and from the sleeve 50 by suitable insulating material 190. They are arranged to rotate with the sleeve 50 and they are located inside of the chamber 64. This chamber 64 extends only about half-way around the machine, (see Fig. 15.) but is provided with a trough 64', which completes the circle of the machine and catches the water that may pass through the openings 62 and 63 from the water-chamber 60 at the back side of the machine and conducts such water into the chamber 64. In the rear of the chamber 64 and beneath the trough 64' is a chamber 188', in which is located suitable commutator-brushes 191, which bear upon the rings 188 and 189. These brushes are suitably connected with electrical conductors leading from a dynamo or other source of electric energy. The heating-coils are connected to the rings 188 and 189 by means of the contact-pieces 192 and 193. (See Fig. 8.) By this means an electric circuit is completed through the heating-coils, and thereby the upper portion of the mold and the distributing-chamber may be kept at a high temperature. By this means the pipe material will be kept in a molten condition while it is being distributed upon the inner surface of the distributing-chamber and the upper part of the mold and while it is traveling along the conical portion of the mold.

*Means for cooling the lower portion of the mold.*—The lower part of the mold is arranged in a circular opening, one half of which is formed in the forward portion of the bracket 59 and the other half of which is formed in a flanged casting 194, secured to the flanges 195 on said bracket 59. (See Fig. 14.) A circular block 196 is arranged in this opening, and the lower portion of the mold passes through this block and rotates therein. Above the block 196 is a water-chamber 197, to which the inlet and outlet pipes 198 and 199 are connected. A series of ribs 200 are preferably provided upon the outer surface of the mold within the water-chamber 197. Sufficient space is provided between the block 196 and the mold to permit a portion of the water from the chamber 197 to pass downward along the wall of the mold to a suitable annular opening 201 in the block 196. This annular opening permits the water to pass entirely around the mold, and openings 201ª (see Fig. 9) are formed in the wall of the mold opposite the annular opening 201, through which a portion of the water may pass through the mold and come in contact with the outer surface of the pipe in the mold. A drip-pan 202 is arranged below the block 196, and any of the water that finds its way downward below the annular opening 201 between the inner surface of the block and outer surface of the mold or between the inner surface of the mold and the outer surface of the pipe will be caught by this drip-pan and discharged through a suitable opening therefrom. By this means the lower part of the mold is cooled and the pipe material when it reaches this part of the mold will quickly become solidified.

*Modifications.*—In Figs. 20, 21, 22, 23, 24, 25, and 26 we have illustrated by diagram sections certain modifications that may be made in the apparatus. In Fig. 20 we have indicated a structure in which the pipe-support is wanting and in which the mold is capable of being rotated in either direction, as indicated in Fig. 27, and in which the plunger and pipe-material distributer is also capable of being rotated in either direction and in which the plunger and pipe-material distributer is capable of being raised and lowered, as indicated in the double-headed arrow upon Fig. 20. In this instance when forming the pipe the plunger will be adjusted until it stands opposite the lower end of the pipe. The mold and plunger will then be rotated at a high speed and the plunger will gradually be raised. By this means the pipe material will be distributed and held by centrifugal force upon the interior of the mold and will become solidified thereon. Substantially the same mechanism that we have shown and described may be used in this instance for rotating the mold and the plunger or distributer and for raising or lowering the plunger or distributer.

In Figs. 21 and 28 we have shown the same arrangement of the mold and the plunger or distributer, except that in this instance the plunger is not designed to have any vertical movement while the mold is to be raised and lowered for the purpose of causing the pipe material to be properly distributed upon its inner surface.

In Figs. 22 and 29 we have indicated the presence of the pipe-support 105 and have indicated by the double-headed arrows that the pipe-support may be raised or lowered or that the pipe-support may remain stationary while the mold and the plunger are raised or lowered. In Figs. 20, 21, and 22 we have indicated that the mold may be made cylindrical, and in these instances it is designed to form the pipe in the mold without feeding it therefrom.

In Figs. 23 and 30 we have indicated that the mold may have a conical portion at its upper end and the plunger be so located as to distribute the pipe material upon this conical portion, from which it will be fed downward along the wall of the mold.

In Figs. 24 and 31 we have indicated the same arrangement substantially of the distributing-chamber and mold with the valve at the top of the mold omitted. When this construction is used, the supply of material to the mold proper will be regulated by the supply to the distributing-chamber, the overflow from this chamber passing into the top of the mold and being fed downward along the wall of the mold, against which it is held by centrifugal force. In this instance we have indicated the pipe-support 105 and have indicated by the double-headed arrow that this pipe-support is capable of being raised and lowered, as in the structure represented by the main figures of the drawings.

In Figs. 25 and 26 we have indicated the presence of both the material-distributer and the valve and have indicated by the double-headed arrow that the plunger and valve may be raised and lowered and also by the double-headed arrows on the lower part of the figure that the support 105 may be raised and lowered. In this instance a larger amount of material may be held in the distributing-chamber and the feeding of the material therefrom to the mold will be regulated by the valve 101.

In Fig. 32 we have indicated that both the mold and the plunger or material-distributer may be rotated in either direction.

In Figs. 26 and 33 we have indicated a modification that may be employed where it is designed to form pipe consisting of two or more metals or materials arranged one inside of the other and united in the process of making. As here shown, we provide a series of distributers arranged one above the other and with tubular stems arranged one within another. With this construction the material from the outer stem and upper distributer will be distributed upon the inner surface of the wall of the mold. The material from the middle stem and middle distributer will be distributed upon the inner surface of this first material, and if three materials are employed that from the inner stem and lower distributer will be distributed upon the inner surface of the second material. By following out this same arrangement and employing a larger number of distributers any number of materials may be employed in the formation of the pipe. These materials will be distributed one within another while in a molten or liquid condition and will become united as they solidify.

No material changes in the apparatus are required in carrying out the modifications illustrated in the several figures on Sheet 16 of the drawings. It is simply necessary in carrying out these modifications to make the necessary changes in the gearing and means for supporting the different parts of the apparatus. All of these modifications involve the same principle.

*General provisions.*—The operation of the apparatus will be understood from the foregoing detailed description of the construction. In the formation of pipe with this apparatus we ordinarily employ suitable metal as the pipe material. This metal will be brought to a molten condition by use of the melting-pot described or by any other suitable means. The molten metal is conducted to the distributing-chamber and passes from this chamber into the top of the mold. The mold and the distributer are rotated at a high speed, generally from nine hundred to three thousand revolutions per minute. The molten metal is thrown by centrifugal force against the wall of the distributing-chamber and the heaviest material will be brought nearest to the wall. The lighter material will be toward the inside of the chamber. We regulate the thickness of the pipe in three ways: first, by the speed at which the pipe-support is lowered; second, by the valve at the mouth of the mold, (when such valve is employed;) third, by the feeding of the material to the distributer.

As we have stated in describing the modifications of the apparatus, the valve at the top of the mold is not essential and may be omitted, in which case the overflow from the distributing-chamber constitutes the feed of material to the mold. In this instance we regulate the supply of material to the mold by regulating the discharge of material from the melting-pot into the conductor that leads to the distributing-chamber.

There are several distinct advantages arising from distributing the pipe material in a distributing-chamber and then feeding the said material to the inner surface of the concentric rotating mold. One of these advantages consists in being able to regulate the feed of the material to the mold or, in other words, to feed the material to the mold in regulated quantities while it is held in a properly-distributed condition by centrifugal force. Another advantage consists in being able to form pipe of smaller diameter than could readily be done by attempting to distribute the pipe material upon the surface of the mold itself. By employing a separate distributing-chamber, which may be made of larger diameter than the mold, as shown in the drawings, the material can be readily distributed upon the surface of this chamber and be held thereon by centrifugal force and while so distributed and held may be fed to the surface of the mold. This feeding to the mold may be governed or regulated as desired by the means hereinbefore described, and the slag or lighter material may during such feeding be retained in the distributing-chamber.

It is necessary to provide the different parts of the apparatus with suitable lubricating devices, some of which are shown in the drawings; but we deem it unnecessary to describe them, as any suitable devices for this purpose may be employed.

While we ordinarily employ metal as the material from which to form the pipe, we do not limit ourselves to the use of any particular material, as pipe may be formed in this apparatus of any material that may be reduced to a fluid condition and distributed while in such condition upon the inner surface of a revolving mold and which will harden or solidify while being held by centrifugal force upon the inner surface of such mold.

We have described the apparatus for the manufacture of "pipe;" but it will be understood that we are not limited to pipe of any particular thickness of walls. By making the article that we form with a small central opening and thick walls we produce a hollow shaft, and by filling this opening we can produce a solid shaft.

We claim as our invention—

1. The combination, with a revoluble mold, and a revoluble distributing-chamber connected therewith, of means for distributing pipe material by centrifugal force upon the inner surface of said chamber and means for feeding said material in regulated quantities from the surface of said chamber to the inner surface of said mold.

2. The combination, with a revoluble mold and a distributing-chamber connected therewith, of means for distributing pipe material upon the inner surface of said chamber and permitting it to pass from said chamber to the inner surface of said mold, and means for regulating the passage of said material from said chamber to said mold.

3. The combination, with a revoluble mold, of a distributing-chamber connected with the mouth of said mold, the diameter of said distributing-chamber being greater than the diameter of said mold, means for feeding pipe material into said chamber and distributing it by centrifugal force over its inner surface and permitting it to pass from said chamber to said mold.

4. The combination, with a revoluble mold, of a distributing-chamber connected with the mouth of said mold, and an adjustable valve located in the mouth of said mold to control and regulate the passage of material from said distributing-chamber to said mold.

5. The combination, with an upright revoluble mold, of means for distributing pipe material upon the inner surface of said mold where it is held by centrifugal force as it passes downward through the mold, means for regulating the distribution of said material and a support upon which the pipe is received.

6. The combination, with an upright revoluble mold, of means for distributing pipe material upon the inner surface of said mold where it is held by centrifugal force as it passes along said surface downward through the mold, means for regulating the distribution of said material, means for regulating the longitudinal movement of said material, and a support upon which the formed pipe is received.

7. The combination, with an upright revoluble mold, of means for distributing pipe material upon the inner surface of said mold where it is held by centrifugal force as it passes along said surface downward through the mold, means for regulating the distribution of said material and a revoluble support upon which the formed pipe is received.

8. The combination, with an upright revoluble mold, of means for distributing pipe material upon the inner surface of said mold where it is held by centrifugal force as it passes along said surface downward through the mold, means for regulating the distribution of said material, a support upon which the formed pipe is received, and means for moving said support vertically.

9. The combination, with an upright revoluble mold, of means for distributing pipe material upon the inner surface of said mold where it is held by centrifugal force as it passes along said surface downward through the mold, means for regulating the distribution of said material, an upright revoluble support upon which the pipe is received as it is formed, means for revolving said mold, and means for revolving said support.

10. The combination, with an upright revoluble mold, of means for distributing pipe material upon the inner surface of said mold where it is held by centrifugal force as it passes along said surface downward through the mold, means for regulating the distribution of said material, a revoluble support upon which the pipe is received as it is formed, means for revolving said mold, means for revolving said support, and means for moving said support vertically.

11. The combination, with an upright mold having an open lower end, of means for supporting said mold and permitting the same to be revolved, means for revolving said mold, means for distributing pipe material upon the inner surface of the revolving mold where it is held by centrifugal force as it passes downward through the mold and means for regulating the distribution of said material.

12. The combination, with an upright mold having an open lower end and a distributing-chamber connected with its upper end, of a revoluble sleeve by which said mold and chamber are suspended, means for revolving said sleeve and said mold, a pipe-material conductor arranged within said sleeve and adapted to conduct pipe material in molten or fluid condition to the interior of said chamber where it is held by centrifugal force, and means for regulating the feed of said material from said chamber to the inner surface of said mold.

13. The combination, with an upright mold having an open lower end, of a revoluble sleeve by which said mold is suspended, means for revolving said sleeve and said mold, means adapted to conduct pipe material to the interior of said mold, means for distributing said pipe material upon the inner surface of said mold where it is held by centrifugal force as it passes downward through the mold and means for regulating the distribution of said material.

14. The combination, with an upright mold having an open lower end, of a revoluble sleeve by which said mold is suspended, means for revolving said sleeve and said mold, a vertically-movable plunger arranged within said mold and adapted to rotate therewith, a tubular stem supporting said plunger and means for conducting pipe material to the interior of said mold through the tubular stem.

15. The combination, with an upright revoluble mold having a distributing-chamber at its upper end and an open lower end, of a pipe-material conductor leading into the distributing-chamber and means for distributing the pipe material upon the inner surface of said mold.

16. The combination, with an upright revoluble mold having an open lower end, of means for conducting pipe material into the upper portion of said mold and distributing it by centrifugal force, in regulated quantities, over the inner surface of said mold where it is held by such force while moving downward, and a vertically-movable support arranged in the lower part of said mold.

17. The combination, with an upright revoluble mold having a distributing-chamber at its upper end, of a pipe-material conductor arranged to conduct material into said distributing-chamber and to distribute it by centrifugal force over its inner surface, and means for regulating the passage of the material from said surface to the surface of the mold.

18. The combination, with the upright revoluble mold having an open lower end and having a central opening in its upper end, of a vertically-movable plunger arranged within said mold, a tubular stem supporting said plunger, openings in the wall of said stem for the passage of pipe material, means for revolving said mold and said plunger together, and a suitable pipe-material conductor arranged within said tubular stem.

19. The combination, with an upright, revoluble mold having an open lower end, of a revoluble vertically-movable plunger arranged within the upper portion of said mold and a valve carried by said plunger and arranged within the mouth of the mold.

20. The combination, with an upright revoluble mold, of a distributing-chamber arranged above said mold and of larger diameter than the mold, and means for conducting pipe material in a molten or fluid condition into said distributing-chamber where it is held by centrifugal force against the wall of said chamber and means permitting the overflow from said chamber to pass onto the inner surface of the wall of the mold.

21. The combination, with an upright revoluble mold, of a distributing-chamber arranged above said mold and of larger diameter than the mold, a vertically-movable plunger arranged within said chamber and the upper portion of said mold, a disk upon said plunger within said chamber, and means for conducting pipe material in a molten or fluid condition into said distributing-chamber above said disk.

22. The combination, with an upright revoluble mold, of a distributing-chamber arranged above said mold and of larger diameter than the mold, a vertically-movable plunger arranged within said chamber and the upper portion of said mold, a valve carried by said plunger and arranged within the mouth of the mold, and means for conducting pipe material in a molten or fluid condition into said distributing-chamber.

23. The combination, with an upright revoluble mold, of a distributing-chamber arranged above said mold and of larger diameter than the mold, a vertically-movable plunger arranged within said chamber and the upper portion of said mold, a disk upon said plunger within said chamber, a valve upon said plunger arranged within the mouth of the mold, and means for conducting pipe material in a molten or fluid condition into said distributing-chamber above said disk.

24. The combination, with an upright revoluble mold, having an opening in its upper end, of a pipe-material conductor leading to a distributing-chamber at the upper end of said mold, means connected with said conductor for reducing pipe material to a molten or fluid condition, and means aside from the rotation of the mold for distributing the pipe material conducted into said mold over its inner surface.

25. The combination, with an upright revoluble mold having an opening in its upper end, of a suitable melting-pot for reducing pipe material to a molten or fluid condition, a conductor extending from said melting-pot to a distributing-chamber located at the upper end of said mold, and means for distributing the molten or fluid pipe material over the inner surface of said mold.

26. The combination, with an upright revoluble mold having an opening in its upper end, of a melting-pot for reducing pipe material to a molten or fluid condition, a conductor extending from said melting-pot, means for heating said conductor, means for distributing the molten or fluid pipe material over the inner surface of said mold and means for regulating the distribution of said material.

27. The combination, with a revoluble mold, of a chamber for distributing pipe material upon the inner surface of said mold, means for regulating the quantity of the material so distributed, and means for heating the walls of said mold.

28. The combination, with an upright revoluble mold, of means for distributing pipe material upon the inner surface of said mold where it is held by centrifugal force as it passes downward in the mold, and means for heating the upper portion of said mold.

29. The combination, in an upright revoluble mold, of means for distributing pipe material upon the inner surface of said mold where it is held by centrifugal force as it passes downward in the mold, and a series of heating-coils surrounding the upper portion of said mold.

30. The combination, with an upright revoluble mold having an open lower end, of means for distributing pipe material upon the inner surface of said mold where it is held by centrifugal force as it passes downward in the mold, means for regulating the distribution of said material and means for cooling the lower portion of said mold.

31. The combination, with an upright revoluble mold, of means for distributing pipe material upon the inner surface of said mold where it is held by centrifugal force as it passes downward in the mold, means for heating the upper portion of said mold, and means for cooling the lower portion of said mold.

32. The combination, with an upright revoluble mold, of means for distributing pipe material upon the inner surface of said mold where it is held by centrifugal force as it passes downward in the mold, a series of heating-coils surrounding the upper portion of said mold, and a water-chamber surrounding the lower portion of said mold.

33. The combination, with the revoluble mold, of the series of heating-coils surrounding said mold, the insulated metallic rings 188 and 189 connected with said heating-coils, and the brushes engaging said rings, for the purpose set forth.

34. The combination, with the revoluble mold, of a support arranged to receive the formed pipe passing from said mold, said support being provided with metallic rings insulated from each other and each forming part of an electric circuit which is adapted to be closed by the pipe resting upon said support, and an alarm arranged in said circuit, substantially as described.

35. The combination, with an upright revoluble mold, of means for distributing pipe material upon the inner surface of said mold and permitting the same to pass downward along said surface, a support arranged to receive the pipe formed in said mold, said support being provided with insulated plates forming part of an electric circuit that is adapted to be closed by the pipe resting upon said support.

36. The combination, with an upright revoluble mold, of means for distributing pipe material upon the inner surface of said mold and permitting the same to pass downward along said surface, while held against said surface by centrifugal force, and a polishing-disk arranged within said mold with its edge in proximity to the wall of the mold, for the purpose set forth.

37. The combination, with an upright revoluble mold, of means for distributing pipe material upon the inner surface of said mold and permitting the same to pass downward along said surface, a plunger arranged within said mold and adapted to rotate therewith, and a polishing-disk carried by said plunger, for the purpose set forth.

38. The combination, with an upright revoluble mold provided with an open lower end, of means for distributing and holding by centrifugal force pipe material upon the inner surface of said mold, means for regulating the distribution of said material, a vertically-movable support arranged within the lower portion of said mold, means for revolving said mold, means for revolving said support, and means for raising and lowering said support.

39. The combination, with an upright revoluble mold, of a vertical sleeve mounted in suitable bearings and forming a support for said mold, a spur-gear secured upon said sleeve, means for driving said gear, and a suitable pipe-material conductor extending through said sleeve.

40. The combination, with an upright revoluble mold, of a revoluble sleeve forming a support for said mold, a vertically-movable plunger arranged within said mold and provided with a tubular stem extending through said sleeve, and means for raising or lowering said plunger and stem.

41. The combination, with an upright revoluble mold, of a revoluble sleeve upon the lower end of which said mold is supported, a vertically movable revoluble plunger arranged within said mold and provided with a tubular stem extending upward through said sleeve, means for raising and lowering said stem and plunger, means for rotating said sleeve and said stem and thereby rotating the mold and the plunger, and a pipe-material conductor arranged within said tubular stem, substantially as described.

42. The combination, with an upright revoluble mold, of a distributing-chamber arranged above said mold and of larger diameter than the mold, means for regulating the passage of material from the distributing-chamber to the mold, and suitable overflow-openings connected with said distributing-chamber.

43. The combination, with an upright revoluble mold having the upper portion of its wall in the form of a frustum of a cone, means for conducting pipe material in a molten or fluid condition into said mold and distributing it upon said wall and an adjustable valve located in the mouth of said mold and adapted to regulate the passage of material into said mold.

44. The combination, with an upright revoluble mold having the upper portion of its wall in the form of a frustum of a cone, with the smaller diameter at the mouth of the mold, of means for conducting molten or fluid pipe material into said mold and distributing it upon said conical wall and a vertically-adjustable valve located in the mouth of said mold.

45. The combination, with an upright revoluble mold having the upper portion of its wall in the form of a frustum of a cone, with the smaller diameter at the mouth of the mold, of means for conducting molten or fluid pipe material into said mold and distributing it upon the conical wall, and a vertically-adjustable valve arranged in the mouth of said mold.

46. The combination, with a revoluble mold, of a distributing-chamber connected with said mold, means for distributing pipe material in a molten or fluid condition over the inner surface of said chamber and the upper part of said mold and feeding it therefrom into said mold, and means for heating said distributing-chamber.

47. The combination, with a revoluble mold, of a distributing-chamber connected with said mold, means for distributing pipe material by centrifugal force over the inner surface of said chamber, means for heating said chamber, and means for feeding pipe material in regulated quantities from said chamber onto the walls of said mold.

48. The combination, with an upright revoluble mold, of a revoluble distributing-chamber arranged above said mold, means for distributing pipe material over the inner surface of said chamber and feeding it therefrom onto the wall of the mold, and suitable heating-coils surrounding said chamber.

49. The combination, with an upright revoluble mold, of a distributing-chamber arranged above and connected with said mold, means for distributing pipe material by centrifugal force over the inner surface of said chamber and for regulating the feed therefrom onto the wall of the mold, and suitable heating-coils surrounding said chamber and said mold.

In witness whereof we have hereunto set our hands this 15th day of January, 1904.

CHARLES B. STRAVS.
JOHN N. JAGER.

In presence of—
A. C. PAUL,
C. G. HANSON.